United States Patent
Manabe et al.

(10) Patent No.: US 9,375,902 B2
(45) Date of Patent: Jun. 28, 2016

(54) POLYESTER FILM

(75) Inventors: Isao Manabe, Otsu (JP); Teruya Tanaka, Otsu (JP); Masahiro Kimura, Otsu (JP)

(73) Assignee: Toray Industries, Inc. (JP)

( * ) Notice: Subject to any disclaimer, the term of this patent is extended or adjusted under 35 U.S.C. 154(b) by 364 days.

(21) Appl. No.: 13/121,597

(22) PCT Filed: Sep. 25, 2009

(86) PCT No.: PCT/JP2009/066592
§ 371 (c)(1),
(2), (4) Date: Mar. 29, 2011

(87) PCT Pub. No.: WO2010/038655
PCT Pub. Date: Apr. 8, 2010

(65) Prior Publication Data
US 2011/0177311 A1    Jul. 21, 2011

(30) Foreign Application Priority Data

Sep. 30, 2008 (JP) ................................ 2008-252811

(51) Int. Cl.
| | |
|---|---|
| *B32B 7/02* | (2006.01) |
| *C08L 67/02* | (2006.01) |
| *C08K 5/20* | (2006.01) |
| *C08K 5/04* | (2006.01) |
| *C08K 5/053* | (2006.01) |
| *B32B 27/18* | (2006.01) |
| *B32B 27/36* | (2006.01) |
| *C08J 5/18* | (2006.01) |
| *C08K 5/098* | (2006.01) |
| *C08K 5/1575* | (2006.01) |
| *C08K 5/00* | (2006.01) |

(52) U.S. Cl.
CPC ............... *B32B 27/18* (2013.01); *B32B 27/36* (2013.01); *C08J 5/18* (2013.01); *C08K 5/098* (2013.01); *C08K 5/1575* (2013.01); *C08K 5/20* (2013.01); *C08J 2367/02* (2013.01); *C08K 5/0083* (2013.01); *Y10T 428/2495* (2015.01)

(58) Field of Classification Search
USPC .................. 428/213; 524/605, 210, 300, 387
See application file for complete search history.

(56) References Cited

U.S. PATENT DOCUMENTS

| | | | | |
|---|---|---|---|---|
| 5,885,689 | A | * | 3/1999 | Hasegawa et al. ............ 428/141 |
| 6,699,549 | B1 | * | 3/2004 | Ueyama et al. ............. 428/36.7 |
| 7,115,320 | B2 | * | 10/2006 | Tanaka et al. ................ 428/458 |

FOREIGN PATENT DOCUMENTS

| | | | | |
|---|---|---|---|---|
| CA | 2649258 | A1 | * | 11/2007 |
| EP | 1295908 | A1 | * | 3/2003 |
| JP | 6-262871 | | | 9/1994 |
| JP | 9-262895 | | | 10/1997 |
| JP | 2001-72841 | | | 3/2001 |
| JP | 2001072841 | A | * | 3/2001 |
| JP | 2002-321277 | | | 11/2002 |
| JP | 2003-201391 | | | 7/2003 |
| JP | 2003-211606 | | | 7/2003 |
| JP | 2006-51747 | | | 2/2006 |
| JP | 2007-76026 | | | 3/2007 |
| JP | 2007076026 | A | * | 3/2007 |
| JP | 2008074008 | A | * | 4/2008 |
| JP | 2009019183 | A | * | 1/2009 |
| WO | 2006/104116 | | | 10/2006 |
| WO | 2007/055225 | | | 5/2007 |

OTHER PUBLICATIONS

Machine_English_Translation_of_JP_2007076026_A; Yakushido, Laminated Film for Transfer Foil; Mar. 2007; JPO; whole document.*
Machine_English_Translation_of_JP_2008074008_A; Uehara; Polyamide System Multilayer Oriented Film; Apr. 2008; JPO; whole document.*
Machine_English_Translation_JP_2009019183_A; Kim, Sang Pil; Heat Shrinkable Polyester Film Whose Rolling up Phenomenon is Improved; Jan. 29, 2009; JPO; whole document.*
Machine_English_Translation_JP_2001072841_A; Kimura, Masahiro; Biaxially Oriented Polyester Film for Molding Fabrication and Fabricated Laminate; Mar. 21, 2001; JPO; whole document.*

* cited by examiner

*Primary Examiner* — Tahseen N Khan
(74) *Attorney, Agent, or Firm* — DLA Piper LLP (US)

(57) ABSTRACT

A polyester film includes ethylene glycol component that accounts for 60 mol % or more of the glycol components in the polyester film, containing a crystal nucleating agent up to 0.01 to 5 mass % relative to the entire polyester film that accounts for 100 mass %, and having a crystal melting energy, $\Delta Hm$, of 5 to 35 J/g.

9 Claims, No Drawings

POLYESTER FILM

RELATED APPLICATIONS

This is a §371 of International Application No. PCT/JP2009/066592, with an international filing date of Sep. 25, 2009, which is based on Japanese Patent Application No. 2008-252811, filed Sep. 30, 2008, the subject matter of which is incorporated by reference.

TECHNICAL FIELD

This disclosure relates to a polyester film, and in particular relates to a polyester film that is so high in formability as to serve preferably as material for building materials, automobile parts, cellular phones, and electric products.

BACKGROUND

As environmental awareness grows in recent years, demands are increasing for solventless paints and plating-alternatives in the fields of building materials, automobile parts, cellular phones, and electric products, and there is a wider use of formable decorative sheets as a method to decorate formed products. In such circumstances, some new types of formable polyester film have been proposed. For instance, a highly formable polyester film with a specific melting point and breaking elongation has been proposed (see Japanese Unexamined Patent Publication (Kokai) No. 2001-72841 for instance). Formable films produced from a 1:1 mixture of polyethylene terephthalate and polybutylene terephthalate have also been disclosed (see Japanese Unexamined Patent Publication (Kokai) No. 2002-321277 for instance). These proposed films, however, requires a high deforming stress during the forming process and accordingly they are difficult to form into a complicated shape. Polyester films for forming components that have a specific melting point and are designed for specific film production conditions have also been disclosed (see Japanese Unexamined Patent Publication (Kokai) No. 2003-211606 for instance). In addition, other studies (see Japanese Unexamined Patent Publication (Kokai) No. 2006-51747 for instance) have disclosed polyester films consisting of three laminated layers, namely Layers A, B, and C, of which Layer B, or the intermediate layer, has formability so that the films have a combination of formability, decorativeness, and smoothness. Furthermore, polyester films that consist of three layers, namely Layers A, B, and C, and require a specified forming stress at a specific melting point and specific temperature have been disclosed (see International Publication WO 2006/104116 for instance). These polyester films, however, do not have a sufficient breaking elongation and cannot serve for deep-draw forming.

There is another proposal that addresses a polyester resin composition and sheet for calendaring that contains a crystal nucleating agent and has a low melting point (see Japanese Unexamined Patent Publication (Kokai) No. 2003-201391 for instance). However, the materials described in this proposal do not have a sufficiently high heat resistance and dimensional stability, and cannot serve for forming processes.

It could therefore be helpful to provide a highly heat resistant and dimensionally stable polyester film that is so high in formability as to maintain a low stress and a high ductility during forming processes.

SUMMARY

We thus provide a polyester film comprising ethylene glycol component that accounts for 60 mol % or more of the glycol components in the polyester film, containing a crystal nucleating agent up to 0.01 to 5 mass % relative to the entire polyester film that accounts for 100 mass %, and having a crystal melting energy, $\Delta Hm$, of 5 to 35 J/g.

The polyester film can be easily processed by heat forming and has a high heat resistance and dimensional stability, and therefore, it can be formed uniformly into a complicated shape, thus serving preferably to forming various components of, for instance, building materials, automobile parts, cellular phones, and electric products.

DETAILED DESCRIPTION

The polyester film is in the form of a film comprising polyester resin. The polyester resin that constitutes the polyester film generically refers to those polymeric compounds in which ester bonds account for the major part of the bonds in the backbone chain, and such resin commonly can be produced through condensation polymerization of a dicarboxylic acid component and a glycol component.

To maintain a required formability, appearance, heat resistance, dimensional stability, and economic efficiency, it is necessary that the ethylene glycol component accounts for 60 mol % or more of the glycol components that constitute the polyester film. If it is less than 60 mol %, the film will be poor particularly in heat resistance and dimensional stability, and will not serve for forming. More than one other glycol components may be contained if the ethylene glycol component accounts for 60 mol % or more of the glycol components.

Such other glycol components that may be contained in the polyester film include aliphatic dihydroxy compounds such as 1,2-propanediol, 1,3-propanediol, 1,3-butanediol, 1,4-butanediol, 1,5-pentanediol, 1,6-hexanediol, and neopentyl glycol; polyoxyalkylene glycols such as diethylene glycol, polyethylene glycol, polypropylene glycol, and polytetramethylene glycol; alicyclic dihydroxy compounds such as 1,4-cyclohexanedimethanol; and aromatic dihydroxy compounds such as bisphenol A, and bisphenol S.

Preferable dicarboxylic acid components that may be used in the polyester film include aromatic dicarboxylic acids such as terephthalic acid, isophthalic acid, phthalic acid, 2,6-naphthalene dicarboxylic acid, diphenyl dicarboxylic acid, diphenyl sulfone dicarboxylic acid, diphenoxyethane dicarboxylic acid, and 5-sodiumsulfone dicarboxylic acid; aliphatic dicarboxylic acids such as oxalic acid, succinic acid, adipic acid, sebacic acid, dimer acid, maleic acid, and fumaric acid; alicyclic dicarboxylic acids such as 1,4-cyclohexanedicarboxylic acid; and hydroxycarboxylic acids such as parahydroxybenzoic acid. Useful dicarboxylate derivatives include esterification products of the dicarboxylic acid compounds such as dimethyl terephthalate, diethyl terephthalate, 2-hydroxyethyl methyl terephthalate, 2,6-dimethyl naphthalene dicarboxylate, dimethyl isophthalate, dimethyl adipate, diethyl maleate, and dimethyl dimerate.

In view of the formability, heat resistance, and transparency, it is particularly preferable that in the polyester film, ethylene glycol and 1,4-cyclohexanedimethanol account for 60 mol % or more and 1 to 30 mol %, respectively, of the glycol components that constitute the polyester film. More preferably, ethylene glycol and 1,4-cyclohexanedimethanol account for 60 to 99 mol % and 1 to 30 mol %, respectively, of the glycol components that constitute the polyester film. By adding 1,4-cyclohexanedimethanol up to 1 to 30 mol %, it will be possible to maintain a high melting point, thus maintaining heat resistance and also possible to depress oriented crystallization during the forming process, thus improving the formability. Furthermore, it will also be possible to adjust the crystallinity to a moderate degree, serving to produce highly a transparent film. The 1,4-cyclohexanedimethanol more preferably accounts for 5 to 25 mol %, most preferably 10 to 20 mol %.

To improve the formability, furthermore, it is preferable that 1,4-butanediol and/or 1,3-propanediol account for 1 to 30 mol % of the glycol components that constitute the polyester film. The addition of 1,4-butanediol and/or 1,3-propanediol up to 1 to 30 mol % serves to improve the molecular mobility during heating and decrease the stress during the forming process, thus improving the formability. It is more preferable that ethylene glycol accounts for 60 to 98 mol % of the glycol components that constitute the polyester film while 1 to 30 mol % is accounted for by 1,4-cyclohexanedimethanol, and also that 1 to 30 mol % is accounted for by 1,4-butanediol and/or 1,3-propanediol.

To further improve the formability and maintain the heat resistance, it is preferable that ethylene glycol accounts for 60 to 90 mol % the glycol components that constitute the polyester film while 2 to 25 mol % is accounted for by 1,4-cyclohexanedimethanol, and also that 8 to 30 mol % is accounted for by 1,4-butanediol and/or 1,3-propanediol.

It is still more preferable that ethylene glycol accounts for 60 to 80 mol % while 3 to 20 mol % is accounted for by 1,4-cyclohexanedimethanol, and also that 15 to 30 mol % is accounted for by 1,4-butanediol and/or 1,3-propanediol.

To dramatically improve the formability of the polyester film, it is necessary for the polyester film (entirety accounting for 100 mass %) to contain a crystal nucleating agent up to 0.01 to 5 mass %. A crystal nucleating agent may be commonly contained in, for instance, unstretched sheets to improve the crystallinity. Stretching of a film containing a crystal nucleating agent tends to increase the crystallinity considerably, which may be likely to conflict with the aim of formability improvement. We found that a film that comprises a specific glycol component, contains a crystal nucleating agent, and has a specific level of crystal melting energy can have an improved formability. It is inferred that addition of a crystal nucleating agent up to 0.01 to 5 mass % acts to form constrained structures that are likely to be the crystal precursors in the polyester film, which is expected to serve to depress the oriented crystallization during the forming process and improve the formability dramatically. The molecular mobility can be evaluated based on the relaxation time T1ρ of the carbonyl carbon determined by solid NMR. The addition of a crystal nucleating agent up to 0.01 to 5 mass % has found to decrease the molecular mobility, which is inferred to be the result of the formation of a restrained structure. Furthermore, the addition of a crystal nucleating agent up to 0.01 to 5 mass % is very preferably in serving to depress the crystal size increase during heat-forming, allowing a high transparency to be maintained after forming. The crystal size may be determined by wide angle X-ray diffraction etc.

Sufficient effect will not be achieved if the content of the crystal nucleating agent is less than 0.01 mass %, whereas a crystal nucleating agent content of more than 5 mass % is not preferable because crystallization can progress during the film production step, decreasing the formability, particularly the uniform formability during vacuum forming, and also reducing the transparency. In view of the formability and transparency, the content of the crystal nucleating agent is preferably 0.05 to 3 mass %, most preferably 0.1 to 2 mass %. A content of 0.1 to 1 mass % is the most preferable in view of the uniform formability.

The crystal nucleating agent as referred to above is a crystalline substance that works to improve the crystallization rate if added to the polyester, and its examples include, for instance, talc, aliphatic carboxylic acid amides, aliphatic carboxylic salts, aliphatic alcohol, aliphatic carboxylates, sorbitol compounds, and organic phosphoric acid compounds. Particularly preferable are one or more crystal nucleating agents selected from the group of aliphatic carboxylic acid amides, aliphatic carboxylic salts and sorbitol compounds.

Useful aliphatic carboxylic acid amides include aliphatic monocarboxylic acid amides such as lauric acid amide, palmitic acid amide, oleamide, stearate amide, erucic acid amide, behenic acid amide, ricinoleic acid amide, hydroxystearic acid amide; N-substituted aliphatic monocarboxylic acid amides such as N-oleyl palmitic acid amide, N-oleyl oleic acid amide, N-oleyl stearic acid amide, N-stearyl oleic acid amide, N-stearyl stearic acid amide, N-stearyl erucic acid, methylol stearic acid amide, methylol behenic acid amide; aliphatic biscarboxylic acid amides such as methylene bisstearic acid amide, ethylene bislauric acid amide, ethylene biscapric acid amide, ethylene bisoleic acid amide, ethylene bisstearic acid amide, ethylene biserucic acid amide, ethylene bisbehenic acid amide, ethylene bisisostearic acid amide, ethylene bishydroxystearic acid amide, butylene bisstearic acid amide, hexamethylene bisoleic acid amide, hexamethylene bisstearic acid amide, hexamethylene bisbehenic acid amide, hexamethylene bishydroxystearic acid amide, m-xylylene bisstearic acid amide, and m-xylylene bis-12-hydroxystearic acid amide; N-substituted aliphatic carboxylic acid bisamides such as N,N'-dioleyl sebacic acid amide, N,N'-dioleyl adipic acid amide, N,N'-distearyl adipic acid amide, N,N'-distearyl sebacic acid amide, N,N'-distearyl isophthalic acid amide, and N,N'-distearyl terephthalic acid amide; and N-substituted urea compounds such as N-butyl-N'-stearyl urea, N-propyl-N'-stearyl urea, N-stearyl-N'-stearyl urea, N-phenyl-N'-stearyl urea, xylylene bisstearyl urea, tolylene bisstearyl urea, hexamethylene bisstearyl urea, diphenyl methane bisstearyl urea, and diphenyl methane bislauryl urea. These may be used singly or as a mixture of two or more thereof. Of these, preferable ones include aliphatic monocarboxylic acid amides, N-substituted aliphatic monocarboxylic acid amides, and aliphatic biscarboxylic acid amides, and particularly preferable ones include palmitic acid amide, stearic acid amide, erucic acid amide, behenic acid amide, ricinoleic acid amide, hydroxystearic acid amide, N-oleyl palmitic acid amide, N-stearyl erucic acid amide, ethylene biscapric acid amide, ethylene bisoleic acid amide, ethylene bislauric acid amide, ethylene biserucic acid amide, m-xylylene bisstearic acid amide, and m-xylylene bis-12-hydroxystearic acid amide.

Specific examples of the aliphatic carboxylates include acetates such as sodium acetate, potassium acetate, magnesium acetate, and calcium acetate; laurates such as sodium laurate, potassium laurate, potassium hydrogen laurate, magnesium laurate, calcium laurate, zinc laurate, and silver laurate; myristates such as lithium myristate, sodium myristate, potassium hydrogen myristate, magnesium myristate, calcium myristate, zinc myristate, and silver myristate; palmitates such as lithium palmitate, potassium palmitate, magnesium palmitate, calcium palmitate, zinc palmitate, copper palmitate, lead palmitate, thallium palmitate, and cobalt palmitate; oleates such as sodium oleate, potassium oleate, magnesium oleate, calcium oleate, zinc oleate, lead oleate, thallium oleate, copper oleate, and nickel oleate; stearates such as sodium stearate, lithium stearate, magnesium stearate, calcium stearate, barium stearate, aluminum stearate, thallium stearate, lead stearate, nickel stearate, and beryllium stearate; isostearates such as sodium isostearate, potassium isostearate, magnesium isostearate, calcium isostearate, barium isostearate, aluminum isostearate, zinc isostearate, and nickel isostearate; behenates such as sodium behenate, potassium behenate, magnesium behenate, calcium behenate, barium behenate, aluminum behenate, zinc behenate, and nickel behenate; and montanate such as sodium montanate, potassium montanate, magnesium montanate, calcium montanate, barium montanate, aluminum montanate, zinc montanate, and nickel montanate. These may be used singly or as a mixture of two or more thereof. Of these, preferable ones include stearates and montanates, and particularly preferable ones include sodium stearate, stearate potassium, zinc stearate, barium stearate, and sodium montanate.

Specific examples of the aliphatic alcohols include aliphatic monoalcohols such as pentadecyl alcohol, cetyl alcohol, heptadecyl alcohol, stearyl alcohol, nonadecyl alcohol, eicosyl alcohol, ceryl alcohol, and melissyl alcohol; aliphatic polyhydric alcohols such as 1,6-hexanediol, 1,7-heptanediol, 1,8-octanediol, 1,9-nonanediol, and 1,10-decanediol; and cyclic alcohols such as cyclopentane-1,2-diol, cyclohexane-1,2-diol, cyclohexane-1,4-diol. These may be used singly or as a mixture of two or more thereof. Of these, preferable ones include aliphatic monoalcohols, and particularly preferable ones include stearyl alcohol.

Specific examples of the aliphatic carboxylates include aliphatic monocarboxylates such as lauric acid cetyl ester, lauric acid phenacyl ester, myristic acid cetyl ester, myristic acid phenacyl ester, palmitic acid isopropylidene ester, palmitic acid dodecyl ester, palmitic acid tetradodecyl ester, palmitic acid pentadecyl ester, palmitic acid octadecyl ester, palmitic acid cetyl ester, palmitic acid phenyl ester, palmitic acid phenacyl ester, stearic acid cetyl ester, and behenic acid ethyl ester; monoesters of ethylene glycol such as glycol monolaurate, glycol monopalmitate, and glycol monostearate; diesters of ethylene glycol such as glycol dilaurate, glycol dipalmitate, and glycol distearate; monoesters of glycerin such as monolauric acid glycerin ester, monomyristic acid glycerin ester, monopalmitic acid glycerin ester, and glyceryl monostearate ester; diesters of glycerin such as dilauric acid glycerin ester, dimyristic acid glycerin ester, dipalmitic acid glycerin ester, and distearic acid glycerin ester; and triesters of glycerin such as trilauric acid glycerin ester, trimyristic acid glycerin ester, tripalmitic acid glycerin ester, tristearic acid glycerin ester, palmitodiolein, palmitodistearin, and oleodistearin. These may be used singly or as a mixture of two or more thereof. Of these, preferable ones include diesters of ethylene glycol, and ethylene glycol distearate is particularly preferable.

Specific examples of the aliphatic/aromatic carboxylic acid hydrazides include sebacate dibenzoate hydrazide, and specific examples of the melamine compounds include melamine cyanurate and melamine polyphosphate. Specific examples of the metal salts of phenylphosphonic acid include zinc salt of phenylphosphonic acid, calcium salt of phenylphosphonic acid, magnesium salt of phenylphosphonic acid, and magnesium salt of phenylphosphonic acid.

Specific examples of the sorbitol compounds include 1,3-di(P-methyl benzylidene)sorbitol, 2,4-di(P-methyl benzylidene)sorbitol, 1,3-dibenzylidene sorbitol, 2,4-dibenzylidene sorbitol, 1,3-di(P-ethyl dibenzylidene)sorbitol, and 2,4-di(P-ethyl dibenzylidene)sorbitol.

Also preferable are mixtures of bis(4-t-butyl phenyl)sodium phosphate, 2,2'-methylene bis(4,6-di-t-butyl phenyl)sodium phosphate, or basic polyvalent metal salt of cyclic organophosphate mixed with one selected from the group of alkali metal carboxylates, alkali metal β-diketonates, alkali metal-ketoacetates, and metal salts of organic carboxylates.

Of the above ones, aliphatic carboxylic acid amide, aliphatic carboxylate, and sorbitol compounds are used particularly preferably in view of the transparency and heat resistance.

In view of the formability, heat resistance, and dimensional stability, it is necessary for the polyester film to have a crystal melting energy, $\Delta Hm$, of 5 to 35 J/g. The crystal melting energy, $\Delta Hm$, as referred to here is defined as the heat quantity of the endothermic peak taking place during melting at a heating rate 20 degrees C./min determined by differential scanning calorimetry (DSC). A polyester film produced from a blend of several polyester resins with different compositions may give two or more endothermic peaks when melted. In such cases, the heat quantity of the endothermic peak of the highest temperature is taken for determining the crystal melting energy of the polyester film. If the crystal melting energy, $\Delta Hm$, is less than 5 J/g, the crystallinity will be too low and the dimensional stability will decrease. Thus it is not preferable. If the crystal melting energy, $\Delta Hm$, is larger than 35 J/g, the crystalline will be too high, and the formability will decrease. Thus, it is not preferable, either.

As a method to adjust the polyester film to a crystal melting energy of 5 to 35 J/g, the glycol components that constitute the polyester film may be produced from two or more glycol components. With respect to the constitution, it is preferable that ethylene glycol and 1,4-cyclohexanedimethanol account for 60 to 99 mol % and 1 to 30 mol %, respectively, of the glycol components. It is more preferable that ethylene glycol accounts for 60 to 90 mol %, 1,4-cyclohexanedimethanol for 2 to 25 mol %, 1,3-propanediol and/or 1,4-butanediol for 8 to 30 mol %.

To maintain the crystal melting energy in that range, it is also preferable to produce the polyester film from two or more dicarboxylic acid components. It is particularly preferably it is constituted of terephthalic acid and isophthalic acid.

To allow the polyester film to be high in heat resistance, dimensional stability, and formability at the same time, it is preferable that the crystal melting energy, $\Delta Hm$, is 10 to 30 J/g, most preferably 15 to 25 J/g.

The polyester film may be constituted of two or more polyester layers. In the case of a film constituted of two or more polyester layers, it is only necessary that ethylene glycol component accounts for 60 mol % or more of the glycol components that constitute the film, and that the film contains a crystal nucleating agent up to 0.01 to 5 mass % relative to the entire polyester film, which accounts for 100 mass %, and has a crystal melting energy, $\Delta Hm$, of 5 to 35 J/g.

If the polyester film is constituted of two or more polyester layers, however, it is preferable that the polyester film comprises a polyester layer (Layer b) wherein ethylene glycol component accounts for 60 mol % or more of the glycol components that constitute the polyester layer (Layer b), and the polyester layer (Layer b) contains a crystal nucleating agent up to 0.01 to 5 mass % relative to the entire layer (100 mass %). It is also preferable that the polyester layer (Layer b) has a crystal melting energy, $\Delta Hm$, of 5 to 35 J/g.

The existence of such a polyester layer serves to allow the desired effects to be developed effectively.

In the above description, the term "polyester film" may be replaced with the term "polyester layer (Layer b)" to illustrate Layer b.

In the case where the polyester film is in the form of a laminated film, it is preferable that that the ratio Tb/TF of the layer thickness Tb (μm) of the polyester layer (Layer b) to the film thickness TF (μm) of the polyester film is 0.6 or more. If two or more polyester layers correspond to the polyester layer (Layer b), the layer thicknesses of all polyester layers that correspond to the polyester layer (Layer b) are summed up, and the total is used as the layer thickness Tb (μm) of the polyester (Layer b). If Tb/TF is less than 0.6, other layers will have significant influence, leading to insufficient achievement of the desired effects. The Tb/TF ratio is more preferably 0.65 or more, still more preferably 0.7 or more. The Tb/TF ratio is 1 if the polyester film is a monolayer film constituted only of the polyester layer (Layer b).

A polyester film constituted of two or more polyester layers is preferable to simultaneous achievement of high formability, good appearance and high handleability. For instance, a polyester component (Layer A) formed of Polyester A and another polyester component (Layer B) formed of Polyester B may be combined into a laminate composed of at least two or more layers. It is preferable to add lubricant particles to increase the windability of the film, but the content of the particles should preferably be minimized to maintain transparency. In the case of a two-layer film with a Layer A/Layer B structure, therefore, at least one side of film can be made slippery to achieve both handleability and transparency by adding particles to either Layer A or Layer B.

The polyester film preferably has a three-layer structure in the form of polyester layer (Layer A)/polyester layer (Layer B)/polyester layer (Layer C) to further improve the formability, appearance and handleability. In this case, Polyester A that forms Layer A and Polyester C that forms Layer C preferably have a glass transition temperature 50 to 90 degrees C., more preferably 55 to 90 degrees C., and still more preferably 60 to 90 degrees C., prevent sticking to the heating rollers etc. during film production. It is still more preferably 60 to 87 degrees C., and most preferably 60 to 85 degrees C. If the sticking of Layer A and Layer C to the heating rollers is prevented during film production, it is very preferable to allow both surfaces of the film to have good appearance.

A three-layer film with a Layer A/Layer B/Layer C structure is also preferable because addition of lubricant particles to only Layer A and Layer C allow the film to have two slippery surfaces and also have transparency at the same time.

In view of economic efficiency and productivity, the polyester that constitutes Layer C is preferably Polyester A. Specifically, Layer A and Layer C preferably have an identical composition. To further improve the economic efficiency and productivity, Layer A and Layer C preferably have the same thickness.

When the layer with the largest thickness is referred to as the main layer while other layers are referred to as sublayers, it is preferable that the main layer ratio, which is defined as (thickness of main layer)/(thickness of entire film), is 0.999 or less. If the main layer ratio is larger than 0.999, the sublayers will be too thin, possibly leading to a decreased film production stability and uneven lamination. The main layer ratio (main layer)/(film entire) is still more preferably 0.99 or less, and most preferably 0.95 or less. Furthermore, it is preferable that that the main layer is Layer B.

A lamination thickness ratio as described above can be achieved by adjusting the discharge rate of the polyester being extruded. The discharge rate can be controlled by changing the screw rotation rate of the extruder, rotation rate of the gear pump, if used, extrusion temperature, and viscosity of the input polyesters.

The lamination layer thicknesses and the main layer ratio of the film can be determined from observation by scanning electronic microscopy, transmission electron microscopy, optical microscopy, etc., at a magnification 500× to 10,000×.

In the case of a laminated constitution, the interlayer adhesion strength between Layer A and Layer B is preferably 5 N/15 mm or more to prevent interlayer peeling after forming.

If the interlayer adhesion strength between Layer A and Layer B is less than 5 N/15 mm, peeling can take place at the interface between Layer A and Layer B in processed products produced from the polyester film or formings of the polyester film. The interlayer adhesion strength is more preferably 8 N/15 mm or more, and most preferably 12 N/15 mm or more.

To adjust the interlayer adhesion strength between Layer A and Layer B to that range, an effective way is to allow Polyester A and polyester B to have similar compositions in the case where the polyester that constitutes Layer A is Polyester A while the polyester that constitutes Layer B is Polyester B.

If for instance, ethylene glycol accounts for 60% of the glycol components that constitute Layer B, it is preferable that similarly, ethylene glycol also accounts for 60% of the glycol components that constitute Layer A.

More specifically, if Polyester B consists of polyethylene terephthalate, polybutylene terephthalate, and polyethylene terephthalate copolymerized with 1,4-cyclohexane dimethanol to achieve a high formability, a large interlayer adhesion strength can be achieved by using Polyester A that consists of polyethylene terephthalate, polybutylene terephthalate, and/or polyethylene terephthalate copolymerized with 1,4-cyclohexane dimethanol. It is particularly preferable that Polyester A and Polyester B have the same composition, because a very large interlayer adhesion strength can be achieved.

To adjust the interlayer adhesion strength between Layer A and Layer B to that range, it is also effective to control the crystal melting energy, ΔHm, of Layer A and that of Layer B at similar values. If Layer A and Layer B have similar ΔHm values, they will have similar crystallinity values and therefore there will be little difference in the oriented crystallization during the forming process, serving to prevent interlayer slippage. Thus, it is very effective.

In addition, if Layer A and Layer B have similar compositions and similar ΔHm values, they will receive similar stresses during the forming process, serving to depress the formability decrease.

In view of formability, heat resistance, and dimensional stability, the polyester film preferably has a plane orientation coefficient of 0.02 to 0.13. The plane orientation coefficient (fn) is defined based on the refractive index of film measured with an Abbe refractometer etc., and expressed by the following equation: $fn=(n_{MD}+n_{TD})/2-n_{ZD}$, where $n_{MD}$, $n_{TD}$ and $n_{ZD}$ represent the refractive index in the length direction of the film, the refractive index in the width direction, and the refractive index in the thickness direction, respectively. If the plane orientation coefficient is less than 0.02, or in the case of a nearly non-oriented film, the dimensional stability can deteriorate though the formability can be maintained, and therefore, it is not preferable. If the plane orientation coefficient exceeds 0.13, on the other hand, the formability can decrease, and therefore, it is not preferable, either. If the film is to be applied to uses where a high dimensional stability is particularly important, the plane orientation coefficient is preferably 0.04 to 0.13, and more preferably 0.07 to 0.13. If the film is to be applied to uses where a moderate dimensional stability and formability are required, it is more preferably 0.03 to 0.12, and most preferably 0.04 to 0.11.

There are no specific limitations on the method to adjust the plane orientation coefficient of the polyester film to 0.02 to 0.13, useful methods include adjusting the film composition to the glycol component contents, adjusting the dicarboxylic acid components to the contents, and adding a crystal nucleating agent up to 0.01 to 5 mass %, followed by stretching at least uniaxially. Biaxial stretching is preferable in view of the handleability and dimensional stability. The draw ratio for this stretching is preferably 2.5 to 3.5, more preferably 2.6 to 3.5, and particularly preferably 2.8 to 3.3. It is desirable that the stretching speed is 1,000 to 200,000%/min. With respect to the method to be used for the biaxial stretching, an unstretched film may be subjected to sequential biaxial stretching that is carried out by stretching in the length direction followed by stretching in the width direction, or stretching in the width direction followed by stretching in the length direction, or subjected to simultaneous biaxial stretching that is carried out by stretching the film nearly simultaneously in the length and width directions. If the film is first stretched in the length direction, followed by stretching in the width direction to carried out sequential biaxial stretching, it is preferably preheated at a temperature of 80 to 100 degrees C., more preferably 85 to 95 degrees C., before stretching in the length direction. The stretching temperature is preferably 80 to 130 degrees C., more preferably 85 to 120 degrees C., and still more preferably 90 to 105 degrees C. For the stretching in the width direction following the stretching in the length direction, the preheat temperature is preferably lower than the temperature used for the longitudinal stretching. If the temperature for the preheating performed before the stretching in the width direction is higher than the temperature used for the stretching in the length direction, the crystal nucleating agent can work to cause the crystallization to progress very rapidly, and it can lead to deterioration in the balance of the orientation in the film and a large variation in the plane orientation coefficient, possibly having an influence on the formability. Thus it is not preferable. The temperature for the stretching in the width direction is preferably 90 to 110 degrees C. It is more preferably 95 degrees C. to 100 degrees C. The addition of the crystal nucleating agent and the adoption of the stretching conditions make it possible to achieve a moderately low degree of orientation.

The conditions for the heat treatment performed after the biaxial stretching of the film are also important for the adjustment of the plane orientation coefficient. The heat treatment can be carried out by appropriately selected generally known conventional methods such as the use of an oven or a heated roll. With respect to the heat treatment temperature, treatment at a high temperature will serve to relax the orientation and achieve the low degree of orientation. The preferable heat treatment temperature range is 160 to 250 degrees C., and in view of the dimensional stability, and formability, it is more preferably 200 to 250 degrees C., still more preferably 190 to 250 degrees C., and most preferably 210 to 245 degrees C. Furthermore, the heat treatment may be performed with the film relaxed in the MD direction and/or the TD direction.

The MD direction as referred to herein is the film's length direction (the film's travelling direction in the film production step), whereas the TD direction is the film's width direction (the direction perpendicular to the MD direction).

The polyester film preferably has a melting point of 230 to 255 degrees C. to have a high heat resistance and formability. If the melting point exceeds 255 degrees C., the heat resistance will be too high and the film will suffer from a very large deforming stress during fabrication, making it difficult to produce a product of a complicated shape. If the polyester film has a melting point less than 230 degrees C., on the other hand, the film can melt during high temperature forming and suffer from a decrease in handleability, and thus it is not preferable. The polyester film more preferably has a melting point of 235 to 255 degrees C., most preferably 235 to 250 degrees C. The melting point as referred to here is defined as the temperature of the endothermic peak taking place during melting at a heating rate 20 degrees C./min determined by differential scanning calorimetry. A film produced from a blend of several polyester resins with different compositions may give two or more endothermic peaks when melted. In such cases, the temperature of the endothermic peak of the highest temperature is taken as the melting point.

If the polyester film is in the form of a laminated film, the polyester layer (Layer B) preferably has a melting point of 230 to 255 degrees C. It is more preferably 235 to 255 degrees C., most preferably 235 to 250 degrees C. If the melting point of the polyester layer (Layer B) is maintained in that range, it will be easy to maintain the melting point of the polyester film in that range.

There are no specific limitations on the method to be used to maintain the melting point of the polyester film in that range, but it is preferable that the polyester resin used in the film production step has a melting point in the range of 230 to 255 degrees C. When polyester resins with different compositions, the polyester resins may have a melting point of 230 degrees C. or more. When a blend of polyester resins with low melting points is used, the catalysts remaining in the resins may be deactivated to prevent the melting point from being lowered by the ester exchange reaction taking place between the resins during melt-kneading, or a phosphorus compound may be added to reduce the catalytic ability. Furthermore, a melting point can be maintained in the range of 233 to 255 degrees C. by using a polyester resin with a smaller amount of catalyst residues.

In view of the film's workability for fabrication such as heat forming, the polyester film at 150 degrees C. preferably has a breaking elongation of 300 to 700% in the film's length and width directions. If the breaking elongation of the film in either the length direction or the width direction at 150 degrees C. is less than 300%, the film may be broken during heat forming, or sufficient deformation may not be achieved. If it is increased to above 700%, it will be very difficult to maintain a high heat resistance as well, and the film will not be able to resist the tension caused by the travelling of the film during preheating in the forming process, leading deformation of the film. Thus it is not preferable. If a breaking elongation in the range is achieved in either the length direction or the width direction, the formability balance will be poor and the will not serve appropriately for forming. It is preferable, therefore, that the breaking elongation is in the range in both the length direction and the width direction. The breaking elongation of the film at 150 degrees C. is preferably 400 to 650%, more preferably 420 to 600%, and still more preferably 450 to 600%, in both the length direction and the width direction, in view of the handleability and formability. The F100 value in the film's length direction and the width direction at 150 degrees C. is preferably 3 to 30 MPa because the stress can be maintained low during the forming process and a wide range of forming conditions can be used. If the F100 is less than 3 MPa, the stress will be too low during the forming process, and the film will be extended during preheating in the forming process, leading to uneven forming. Thus it is not preferable. If the F100 value is larger than 30 MPa, the stress will be high during the forming process, and the effective range of forming conditions will be narrow. Thus it is not preferable. The F100 value is more preferably 5 to 20 MPa, and most preferably 7 to 15 MPa.

To determine the F100 value at 150 degrees C., a rectangle film sample with a test length of 20 mm is cut out, preheated for 90 seconds in a temperature controlled bath set to 150 degrees C., and subjected to a tensile test at a strain rate of 500 mm/min, and the stress at 100% elongation is taken as the value. The breaking elongation at 150 degrees C. is defined as the ductility at the time when the film is broken in a tensile test performed under those conditions.

For the F100 value and the breaking elongation of the polyester film at 150 degrees C. to be in the range film in both the length direction and the width direction, it is preferable to stretch the film 2.5 to 3.5 times at 90 to 130 degrees C. in both the length direction and the width direction, and at the same time, the two dimensional extension ratio (extension ratio in the length direction×extension ratio in the width direction) is preferably 7 to 11. It is preferable that heat treatment is carried out at a high temperature in the heat fixation step after the stretching, because the orientation in the amorphous portions of the film can be relaxed. The heat treatment temperature is preferably 200 to 255 degrees C., and more preferably 220 to 255 degrees C. It is still more preferable to use the stretching conditions described as a means of achieving a preferable plane orientation coefficient. If the stretching conditions are adopted, restrain structures, which are considered to be the crystal precursors, will be formed, and a F100 value and breaking elongation in the preferable range can be achieved easily.

To achieve a breaking elongation in the range, it is necessary to minimize defects in the film during and after the film production process. To minimize defects, it is important to install dust-proof equipment for the film production atmosphere, and maintain the extruder, stretching roll, wind-up roll, etc.

It is also important to prevent degradation of the polymer during extrusion. To prevent degradation of the polymer, it is also necessary to optimize the extrusion temperature and residence time of the polymer, purge nitrogen from the extruder, remove moisture from the polymer, etc. The preferable extruded temperature is 10 to 40 degrees C. above the melting point of the polymer. Depending on the type of polymer, the residence time of the polymer is preferably as short as possible unless unmelted parts remain.

For the polyester film to have good appearance and gloss required for forming material, it is preferable that the haze of the film is 0.1 to 3%. If the haze exceeds 3%, the film will appear opaque, possibly leading to inferior decorativeness of the appearance. If the haze is less than 0.1%, on the other hand, the film will suffer from deterioration in slippage and handleability, scratches on the film surface, and creases caused when wound up into a roll, which not only has adverse influence on the appearance required for forming material, but also cause deterioration in overall handleability of the film itself. In view of the appearance required for forming material, the haze is more preferably in the range of 0.2 to 2.5%, particularly preferably 0.3 to 2%.

With respect to the method to achieve a haze in the range of 0.1 to 3%, it is preferable that lubricant particles are added only Layer A and Layer B, and optical characteristics are controlled while maintaining a required handleability of the film. In the case of a three-layer constitution of Layer A/Layer B/Layer C, it is preferable to add particles to only Layer A and Layer C. In particular, it is preferable that Layer A contains 0.005 to 0.5 mass %, more preferably 0.01 to 0.2 mass %, particles that meet the equation $0.5 \leq P/t_A \leq 2$ where P represents the diameter (in μm) of the particles, which are assumed to be spherical, while $t_A$ denotes the layer thickness (in μm) of Layer A. There are no specific limitations on the lubricant particles to be used, but it is preferable that they are externally added particles rather than internally precipitated ones. Useful materials for the externally added particles include, for instance, wet and dry silica, colloidal silica, aluminum silicate, titanium dioxide, calcium carbonate, calcium phosphate, barium sulfate, aluminum oxide, and organic materials such as styrene, silicone, acrylic resins, methacrylic resins, polyesters, and divinyl compounds. In particular, preferable materials include inorganic ones such as wet and dry silica and alumina, as well as styrene, silicone, acrylic resins, methacrylic resins, polyesters, and divinylbenzene. Two or more of these materials for externally added particles may be used in combination.

As described above, the polyester film contains a specific quantity of crystal nucleating agents and a specific range of crystal melting energy, and as a result, it is very high in formability, heat resistance, and dimensional stability.

Furthermore, the characteristics of the film can be further improved by using a crystal nucleating agent selected from a group of specific compounds, adjusting the film's plane orientation coefficient to a specific range, adjusting the film's breaking elongation at 150 degrees C. to a specific range in both the length direction and the width direction of the film, or appropriately combining two or more thereof to achieve synergy effect.

Specific methods for producing the polyester film are illustrated in detail below, but it should be understood that they are not construed as being limited thereto. First, the polyester resins to be used are prepared. The nucleating agent should preferably be added to the polyester resins in advance to ensure high handleability and dispersibility. They are dried in a nitrogen atmosphere or vacuum, for instance, at 180 degrees C. for four hours to adjust the moisture content of the polyester resins to preferably 50 ppm or less. If a mixture of two or more polyesters is to be used, they are weighed off, mixed in a predetermined proportion, and then dried. Subsequently, it is supplied to a separate extruder and melt-extruded. The nucleating agent may be blended as the polyester mixture is supplied to the extruder. The resin drying step may be omitted if a vented twin screw extruder is used for the melt-extrusion step. Then, foreign objects are removed and the material is extruded smoothly though a filter and gear pump, followed by discharge through a T-die on a cooling drum to form a sheet. If a laminate consisting of two or more layers is to be produced, two layers to constitute a A/B type laminated film are combined through, for instance, a feedblock or a multimanifold installed at the top portion of the T-die, and discharged through a T-die on a cooling drum to form a sheet. To produce a A/B/C type three-layer laminated film, Polyester A, Polyester B, and Polyester C are supplied to separate extruders for melt-extrusion. If Polyester A and Polyester C have the same composition, only two extruders may be used and a three-layer laminated film of a Layer A/Layer B/Layer A structure may be produced through the feedblocks or multimanifolds. Discharging on a cooling drum to produce a sheet may be carried out by, for instance, using a wire type electrode or a tape type electrode to apply static electricity, a casting technique in which a water layer is formed between the casting drum and the extruded polymer sheet, using a casting drum heated between the glass transition point of the polyester resin and the temperature 20 degrees C. below the glass transition point to allow the extruded polymer to adhere to the drum, and using a combination of two or more thereof. Thus, the sheet-like polymer is brought into close contact with the casting drum, and then cooled for solidification to provide a unstretched film. Of these casting techniques, application of static electricity is preferred when polyester is used, because high productivity and planarity can be achieved. The polyester film can show good characteristics when used as an unstretched film, but it is more preferable that it is biaxially stretched to enhance the heat resistance and dimensional stability. With respect to the method to be used to stretch the unstretched film, it may be subjected to sequential biaxial stretching that is carried out by stretching in the length direction followed by stretching in the width direction, or stretching in the width direction followed by stretching in the length direction, or subjected to simultaneous biaxial stretching that is carried out by stretching the film nearly simultaneously in the length and width directions.

With respect to the stretching ratio in the stretching, the film is stretched preferably 2.5 to 3.5 times, more preferably 2.8 to 3.5 times, and particularly preferably 3 to 3.4 times, in each direction. It is desirable that the stretching speed is 1,000 to 200,000%/min. The stretching temperature is preferably 80 to 130 degrees C., and it is more preferable that the stretching temperature is 85 to 120 degrees C. for the stretching in the length direction while the stretching temperature is 90 to 110 degrees C. for the stretching in the width direction. The stretching may be carried out two or more times in each direction. To further enhance the desired effects, it is preferable that preheating at 80 to 100 degrees C., more preferably 85 to 95 degrees C., is performed before the stretching in the length direction. The stretching temperature is preferably 80 to 130 degrees C., more preferably 85 to 120 degrees C., and still more preferably 90 to 105 degrees C. The conditions for the stretching in the width direction performed after the stretching in the length direction preferably include a preheating temperature that is lower than that for the stretching in the length direction. If the preheating temperature for the stretching in the width direction is higher than the stretching temperature for the stretching in the length direction, the crystal nucleating agent can work to cause the crystallization to progress very rapidly, and it can lead to deterioration in the balance of the orientation in the film and a large variation in the plane orientation coefficient, possibly having an influence on the formability. Thus it is not preferable. The temperature for the stretching in the width direction is preferably 90 to 110 degrees C. It is more preferably 95 degrees C. to 100 degrees C., and as in the case of the preheating temperature, this stretching preferably carried out at a temperature lower than the temperature for the stretching in the length direction.

In addition, the film is heat-treated following the biaxial stretching. The heat treatment can be carried out by appropriately selected generally known conventional methods such as the use of an oven or a heated roll. This heat treatment is performed at a temperature above 120 degrees C. and below the melting point of the polyester. It is preferably in the range of 160 to 250 degrees C., more preferably 160 to 200 degrees C. in cases where dimensional stability is important, and most preferably 165 to 190 degrees C. To maintain a moderate dimensional stability and formability, the heat treatment temperature is preferably 190 to 250 degrees C., and more preferably 200 to 250 degrees C. In view of the transparency and dimensional stability of the film, it is still more preferably 210 to 245 degrees C. The heat treatment may be continued for an appropriate time as long as the characteristics do not deteriorate, but the time is preferably 1 to 60 seconds, and more preferably 1 to 30 seconds. Furthermore, the film may be in a relaxed state when it is heat-treated in the length direction and/or in the width direction. Corona treatment or coating may also be carried out on at least one surface to increase the adhesion to an ink printing layer, adhesive layer, or deposited layer.

With respect to the method to be used to perform an in-line coating step in the film production process, it is preferable to disperse a coating composition in water, spread it uniformly over the film stretched at least in one direction using a metering bar, gravure roll, etc., and dried while being stretched. The coating thickness is preferably 0.01 to 0.5 µm.

As the polyester film is high in formability, heat resistance, and dimensional stability, it is preferably used for forming. If the polyester film is used for forming, very high quality formings can be produced because it can be formed into a complicated shape. Applicable forming methods include, for instance, in-mold forming and insert forming. In-mold forming as referred to here is a forming method in which the film itself is placed in the die, followed by injection and resin compression to produce decorated formings of a desired shape. Insert forming is a forming method in which the film body to be placed in the die is prepared by vacuum forming, vacuum/pressure forming, plug-assist forming, etc., and resin is filled to its shape to produce decorated formings. The polyester film is used particularly preferably for insert forming because it can be formed into complicated shapes.

If used for insert forming, a highly adhesive layer may be provided on the resin side of the film to enhance the contact with the resin to be injection-formed. Preferable examples of the resin to be injection-formed include polyester, polyamide, polycarbonate, ABS (acrylonitrile-butadiene-styrene), AS (acrylonitrile-styrene), polypropylene, polymethyl methacrylate, TPO (thermoplastic olefin elastomer), and mixtures thereof, and accordingly the film is preferably highly adhesive to these resins. There are no specific limitations on the highly adhesive layer, but examples include polyester based, urethane based, acrylic, and chloride polypropylene based materials.

If used for insert forming, the polyester film preferably has a thickness of 75 to 500 µm, more preferably 100 to 300 µm, and still more preferably 150 to 250 µm, to obtain formings with a deep shape and form stability.

The polyester film may be laminated with a forming base before use. By combining with the forming base, the film can form a formable decorative sheet with a base/polyester film structure. If the polyester film is further coated with a weather resistant material, the sheet will have a base/polyester film/weather resistant layer.

There are no specific limitations on the base, and useful materials include resin sheet, metal plate, paper, and wood. Of these, a resin sheet is preferable in view of the formability, and in particular, a thermoplastic resin sheet is preferable because of its high formability.

There are no specific limitations on the thermoplastic resin sheet as long as it is a heat-formable polymer sheet, and preferable examples include polyester sheet, acrylic sheet, ABS (acrylonitrile-butadiene-styrene) sheet, polystyrene sheet, AS (acrylonitrile-styrene) sheet, TPO (thermoplastic olefin elastomer) sheet, and TPU (thermoplastic urethane elastomer). The sheet preferably has a thickness of 50 µm to 2,000 µm, more preferably 100 µm to 1,800 µm, and still more preferably 250 to 1,500 µm. When used after being laminated with a base, the polyester film preferably has a thickness of less than 10 to 75 µm, more preferably 12 to 50 µm, and most preferably 15 to 40 µm, in view of the laminatability and handleability.

The polyester film is preferably provided with an adhesive layer to enhance the adhesion to the base. There are no specific limitations on the adhesive layer, but preferred materials include polyester based, urethane based, acrylic, and chloride polypropylene based materials.

The forming method for the formable decorative sheet comprising the polyester film will be illustrated in detail below, but it should not be construed as being limited thereto.

The polyester film or the formable decorative sheet is heated with a 150 to 400 degrees C. far-infrared heater up to a surface temperature of 50 to 230 degrees C., and the die is pushed up, followed by vacuuming to obtain intended formings. In the case of a high ratio forming, the sheet is air-pressured for further forming to produce formings with a deeper shape. A formable decorative sheet thus formed is trimmed to provide a forming form. This forming form may be used without further processing, but a resin such as describe above may be injected in concave portions using a die applied to those portions. Thus, a forming material is completed.

If the polyester film is used for in-mold forming or insert forming, the film surface can be provided with a decorative layer to enhance the appearance of the forming material, and therefore, it is preferable. The decorative layer serves to add decorative features such as colors, rough surfaces, patterns, woodgrain, metallic luster, and pearly luster. There are no specific limitations on the method to be used for formation of the decorative layer, but it may be carried out by, for instance, metal deposition, printing, coating, or decalcomania.

There are no specific limitations on the metal to be used for the metal deposition, but preferable ones include indium (melting point: 156 degrees C.), tin (melting point: 228 degrees C.), aluminum (melting point: 660 degrees C.), silver (melting point: 961 degrees C.), copper (melting point: 1,083 degrees C.), zinc (melting point: 420 degrees C.), nickel (melting point: 1,453 degrees C.), chrome (1,857 degrees C.), titanium (1,725 degrees C.), platinum (melting point: 1,772 degrees C.), and palladium (melting point: 1,552 degrees C.), which may be used singly or as an alloy thereof, but it is preferable use one with a melting point of 150 to 400 degrees C. The use of a metal with a melting point in the range is preferable because the deposited metal layer can be processed in the temperature range where the polyester film is also processable, and defects in the deposited layer can be easily prevented from being caused by processing. It is particularly preferable that the metal compound to be used has a melting point of 150 to 300 degrees C. There are no specific limitations on the metal with a melting point of 150 to 400 degrees C., but preferable ones include indium (157 degrees C.) and tin (232 degrees C.), of which indium is particularly preferable in view of its metallic gloss and hue.

Methods that can be used to produce the deposited thin film include vacuum deposition, EB deposition, sputtering, and ion plating. To improve the contact between the polyester film and the deposited layer, the film surface may be subjected in advance to pretreatment such as corona discharge and anchor coating. The vapor-deposited film preferably has a thickness of 1 to 500 nm, more preferably 5 to 300 nm. It is more preferably 10 to 200 nm in view of the productivity.

As one of the applicable forming processes, transfer foil production is also a preferable application. Transfer foil is commonly composed of a film base laminated on one of its surfaces with a highly adhesive layer, mold release layer, printing layer, adhesive layer, etc., in this order. Generally known transfer methods for production of transfer foil include so-called "hot stamping" processes that use transfer equipment in which transfer to the object is carried out on a heating roller, and so-called "simultaneous forming" and "transfer" processes including the in-mold transfer process in which transfer material is placed on the die in an injection forming machine or a blow forming machine so that the adhesive layer comes in contact with the forming resin, followed by injecting or blowing the forming resin, carrying out the transfer simultaneously with the forming, and taking out the formed product after cooling. If used for transfer foil production, the film preferably has a thickness of 50 to 200 µm, more preferably 60 to 150 µm, in view of the formability and heat resistance.

As one of the applicable forming processes, the film is also used preferably as protective film for decorative sheets. When performing the in-mold forming or insert forming, a protective film may be used to prevent deterioration in luster and surface flaws on the decorative sheet, but formability and surface gloss are sought after. The polyester film maintains very good surface properties and high formability during heating, and therefore, it can show very good characteristics as a protective film for forming.

The polyester film has high formability, and serves in heat processing processes such as vacuum forming and air-pressure forming for easy production of a formed product that accurately fits the mold. Accordingly, it is preferably used for forming applications such as in-mold forming, insert forming, transfer foil, and protective film. Thus, the invention relates to a polyester film that will be preferably used as components for producing formings including building materials, automobile parts, cellular phones, and electric products.

EXAMPLES

Our films and methods are illustrated in detail below with reference to Examples. The following methods were used for measurement and evaluation.

(1) Melting Point, Crystal Melting Energy, Glass Transition Temperature

A differential scanning calorimeter (RDC220, supplied by Seiko Electronics industrial Co., Ltd.) was used to carry out measurement and analysis in accordance to JIS K7121-1987 and JIS K7122-1987. A 5 mg sample of a polyester layer or polyester film is heated from 25 degrees C. to 300 degrees C. at 20 degrees C./min, and the temperature at the endothermic peak in the resulting DSC curve is taken as melting point. The heat quantity per unit mass determined from the area of the endothermic peak is taken as crystal melting energy. If the DSC curve is a straight line, the point near the peak where the line deviates from the baseline and the point where it meets the baseline again are connected with a straight line, while if the DSC curve is a curved line, the two points are connected with the curved line, to carry out analysis. In the case where there are two or more endothermic peaks, the temperature at the endothermic peak located at the highest temperature position is taken as melting point, and the heat quantity per unit mass determined from the area of the endothermic peak is taken as crystal melting energy. The endothermic peaks with a minute peak size (0.5 J/g or less in terms of crystal melting energy) that appear on the baseline are removed as noise. The change in specific heat caused by the transition from the glass state to the rubber state is measured, and the intermediate glass transition temperature determined from the intersection between the line that is at the same distance in the longitudinal axis (representing the heat flow) direction from the extensions of the baselines and the stepwise changing portion of the glass transition curve is determined and taken as glass transition temperature.

(2) Haze

A hazemeter (HGM-2GP, supplied by Suga Test Instruments Co., Ltd.) was used to determine the film's haze in accordance with JIS K 7105 (1985). Measurements were taken at three appropriately selected points, and their average was taken.

(3) Film Thickness, Layer Thickness

The film is embedded in epoxy resin, and a section of the film is cut out with a microtome. The section is observed by transmission electron microscopy (TEM H7100, supplied by Hitachi, Ltd.) at a magnification of 5000× to measure the film thickness and polyester layer thickness. The TB/TF ratio and the main layer ratio are calculated from the measured film thickness and layer thickness.

(4) Composition of Polyester Layer and Polyester Film

The polyester layer or film is dissolved in hexafluoroisopropanol (HFIP) or a mixed solvent of HFIP and chloroform, and qualitative analysis and content determination of the dicarboxylic acid component and the glycol component can be carried out using $^1$H-NMR or $^{13}$C-NMR. In the case of a laminated film, each layer in the film is scraped out depending on the layer thickness, and used for evaluation. For the film, the composition is calculated from the mixing ratio of the polyester resin used for film production.

(5) Plane Orientation Coefficient

Using the sodium D line (wavelength 589 nm) as light source, the refractive index in the length direction ($n_{MD}$), the refractive index in the width direction ($n_{TD}$), and the refractive index in the thickness direction ($n_{ZD}$) are measured with an Abbe refractometer, and the plane orientation coefficient (fn) is calculated by the following equation.

$$fn=(n_{MD}+n_{TD})/2-n_{ZD}.$$

(6) Gloss

For the surface formings, the 60 degrees specular gloss is measured with a digital multi-angle gloss meter (UGV-5D, supplied by Suga Test Instruments Co., Ltd.) according to the method specified in JIS Z 8741 (1997). Measurements are taken for the case where n=5. The maximum and minimum values are removed and the average of the others is taken as gloss.

(7) Stress at 100% Elongation, Breaking Elongation

A rectangle piece with a size of length 150 mm×width 10 mm in the length direction and in the width direction, respectively, was cut out of the film to provide a test sample. Using a tensile tester (Tensilon tester UCT-100, supplied by Orientec Co., Ltd.), tensile test was carried out in the film's length direction and the width direction under the conditions of an initial chuck distance of 20 mm and a tension speed of 500 mm/min. The film sample was placed in a temperature controlled bath adjusted to 150 degrees C., and preheated for 60 seconds before start of the tensile test. The load applied to the film sample stretched by 100% was measured and divided by the original cross section of the sample before start of the test (film thickness×10 mm) to provide the stress at 100% elongation (the F100 value). The breaking elongation of a film is defined as its ductility measured at the time when it is fractured. For each sample, five measurements were taken, and their average was used for evaluation.

(8) Formability

An adhesive and curing agent (AD503 and CAT10, respectively, supplied by Toyo-Morton, Ltd.) was combined with an ethyl acetate is mixed to provide a 20:1:20 mixture, which is applied to the polyester film to form an adhesive layer. An ABS sheet with a thickness of 1,500 μm was bonded to this adhesive layer, and a laminator was used to carry out thermocompression bonding (80 degrees C., 0.1 MPa, 3 m/min) to provide a formable decorative sheet. The formable decorative sheet was heated with a 400 degrees C. far-infrared ray heater to adjust the surface temperature to 150 degrees C., and subjected to vacuum forming over the surface of a die (bottom diameter 50 mm) heated at 70 degrees C. The state of the product formed on the die was evaluated in terms of the forming quality (draw ratio: product height/bottom diameter).

S: Successfully formed at a draw ratio of 0.7 or more

A: Successfully formed at a draw ratio of 0.6 to less than 0.7

B: Successfully formed at a draw ratio of 0.5 to less than 0.6

C: Poor surface contact, failing to be formed at a draw ratio 0.5 or more (9) Uniform Formability The center of the bottom face of the product formed in (8) was used as the reference point. Two lines, namely, an appropriate line passing the center and a line perpendicular to the former, were drawn, and the thickness was measured at the center and at the five points mm, 15 mm, 25 mm, 35 mm, and 45 mm away from the center on each of the four radial line sections extending from the center (21 points in total). The forming irregularity of the product was evaluated based on the difference between the maximum and minimum of the film thickness measurements.

Forming irregularity=(maximum measured thickness−minimum measured thickness)/average thickness S: Forming irregularity is less than 0.05

A: Forming irregularity is 0.05 or more and less than 0.1

B: Forming irregularity is 0.1 or more and less than 0.15

C: Forming irregularity is 0.15 or more

(10) Heat Resistance A

A sample taken from the vacuum-formed product prepared in (8) was evaluated according to the following criteria.

S: Free from roughness on the surface of the formed film, and the absolute value of the difference in the gloss of the film between before and after the forming is less than 3.

A: Free from roughness on the surface of the formed film, and the absolute value of the difference in the gloss of the film between before and after the forming is 3 or more and less than 5.

B: Roughness found in some parts of the surface of the formed film, and the absolute value of the difference in the gloss of the film between before and after the forming is less than 5.

C: Roughness found on the surface of the formed film, and the absolute value of the difference in the gloss of the film between before and after the forming is 5 or more.

(11) Heat Resistance B

A sample taken from the vacuum-formed product prepared in (8) was held in 70 degrees C. hot air for 5 minutes in an oven, and evaluated according to the following criteria.

S: The absolute value of the difference in surface roughness between before and after the heat treatment is less than 10 nm.

A: The absolute value of the difference in surface roughness between before and after the heat treatment is 10 nm or more and less than 20 nm.

B: The absolute value of the difference in surface roughness between before and after the heat treatment is 20 nm or more and less than 30 nm.

C: The absolute value of the difference in surface roughness between before and after the heat treatment is 30 nm or more.

(12) Dimensional Stability A

A rectangle sample with a length 50 mm×a width 4 mm in the length direction and in the width direction, respectively, was cut out from the film. Thermomechanical analysis equipment (TMA EXSTAR 6000, supplied by Seiko Instruments Inc.) was used to measure the dimensional change at 80 degrees C. under the conditions of a sample length of 15 mm, load of 19.6 mN, and heating rate of 5 degrees C./min, and evaluation was performed according to the following criterion.

Dimensional change rate (%)={[sample length (mm)−length of film after being held (mm)]/sample length (mm)}×100.

S: Dimensional change rate is less than ±3% in the length direction and in the width direction of the film.

A: Dimensional change rate is ±3% or more and less than ±4% in the length direction and in the width direction of the film.

B: Dimensional change rate is ±4% or more and less than ±5% in the length direction and in the width direction of the film.

C: Dimensional change rate is ±5% or more in the length direction and in the width direction of the film.

(13) Dimensional Stability B

A rectangle sample with a length 50 mm×a width 4 mm in the length direction and in the width direction, respectively, was cut out from the film. Thermomechanical analysis equipment (TMA EXSTAR 6000, supplied by Seiko Instruments Inc.) was used to measure the dimensional change at 150 degrees C. under the conditions of a sample length of 15 mm, load of 19.6 mN, and heating rate of 5 degrees C./min, and evaluation was performed according to the following criterion.

Dimensional change rate (%)={[sample length (mm)−length of film after being held (mm)]/sample length (mm)}×100.

S: Dimensional change rate is less than ±3% in the length direction and in the width direction of the film.

A: Dimensional change rate is ±3% or more and less than ±4% in the length direction and in the width direction of the film.

B: Dimensional change rate is ±4% or more and less than ±5% in the length direction and in the width direction of the film.

C: Dimensional change rate is ±5% or more in the length direction and in the width direction of the film.

(Production of Polyester)

Polyester resin to be used for film production was prepared as follows.

(PET)

A mixture of 100 parts by mass of dimethyl terephthalate and 70 parts by mass of ethylene glycol was prepared and 0.04 parts by mass of manganese acetate was added, followed by heating gradually to a final temperature of 220 degrees C. at which ester interchange reaction was performed while distilling out methanol. Then, 0.025 parts by mass of an aqueous 85% phosphoric acid solution and 0.02 parts by mass of germanium dioxide were added and subjected to a condensation polymerization reaction at 290 degrees C. under a reduced pressure of 1 hPa to provide a polyethylene terephthalate resin copolymerized with 2 mol % of the by-product diethylene glycol, which had an intrinsic viscosity 0.65.

(PBT)

A mixture of 100 parts by mass of terephthalic acid and 110 parts by mass of 1,4-butanediol was heated at 140 degrees C. in a nitrogen atmosphere to provide a uniform solution, and 0.054 parts by mass of tetra-n-butyl orthotitanate and 0.054 parts by mass of monohydroxybutyltin oxide were added, followed by performing an esterification reaction. Then, 0.066 parts by mass of tetra-n-butyl orthotitanate was added and a condensation polymerization reaction was carried out under a reduced pressure to prepare a polybutylene terephthalate resin with an intrinsic viscosity of 0.88. Subsequently, crystallization was carried out at 140 degrees C. in a nitrogen atmosphere, followed by solid phase polymerization at 200 degrees C. for 6 hours in a nitrogen atmosphere to provide a polybutylene terephthalate resin with an intrinsic viscosity of 1.22.

(PTT)

Using tetrabutyl titanate as catalyst, 100 parts by mass of dimethyl terephthalate and 80 parts by mass of 1,3-propanediol were heated gradually from 140 degrees C. up to 230 degrees C. in a nitrogen atmosphere, followed by performing an ester interchange reaction while distilling out methanol. Furthermore, a condensation polymerization reaction was carried out at a constant temperature of 250 degrees C. for 3 hours to provide a polytrimethylene terephthalate resin with an intrinsic viscosity [η] of 0.86.

(PET-G)

Copolymerized with polyester copolymerized with 30 mol % of 1,4-cyclohexanedimethanol (Easter PETG 6763, supplied by Eastman Chemical Company) and PET were mixed with a mass ratio of 90:10 and kneaded at 280 degrees C. in a vented twin screw extruder to provide a polyethylene terephthalate resin copolymerized with 27 mol % of 1,4-cyclohexanedimethanol and further copolymerized with 2 mol % of by-product diethylene glycol.

(PET-I)

A mixture of 82.5 parts by mass of dimethyl terephthalate, 17.5 parts by mass of dimethyl isophthalate, and 70 parts by mass of ethylene glycol was prepared, and 0.09 parts by mass of magnesium acetate and 0.03 parts by mass of antimony trioxide were added, followed by heating gradually to a final temperature of 220 degrees C. at which ester interchange reaction was performed while distilling out methanol. Then, 0.020 parts by mass of an aqueous 85% phosphoric acid solution was added to the ester interchange reaction product, and the mixture was transferred to a condensation polymerization reaction vessel. While heating the material in the polymerization vessel, the pressure in the reaction system was reduced gradually, followed by a condensation polymerization reaction at 287 degrees C. under a reduced pressure of 1 hPa to provide a polyethylene terephthalate resin copolymerized with 17.5 mol % of isophthalic acid and further copolymerized with 2 mol % of the by-product diethylene glycol, which had an intrinsic viscosity 0.7.

(Particle M)

A mixture of 100 parts by mass of dimethyl terephthalate and 70 parts by mass of ethylene glycol was prepared and 0.04 parts by mass of manganese acetate was added, followed by heating gradually to a final temperature of 220 degrees C. at which ester interchange reaction was performed while distilling out methanol. Then, 0.025 parts by mass of an aqueous 85% phosphoric acid solution and 0.02 parts by mass of germanium dioxide were added. Furthermore, an ethylene glycol slurry of agglomerated wet silica particles with a number average particle diameter of 1.2 μm was add up to a particle concentration of 2 mass %, followed by a condensation polymerization reaction at 290 degrees C. under a reduced pressure of 1 hPa to provide a polyethylene terephthalate particle master copolymerized with 2 mol % of the by-product diethylene glycol, which had an intrinsic viscosity 0.65.

(Nucleating Agent M1)

The PET thus prepared and barium stearate were mixed at a mass ratio of 90:10, and kneaded at 280 degrees C. in a vented twin screw extruder to provide master pellets (Nucleating agent M1) containing 10 mass % of barium stearate.

(Nucleating Agent M2)

The PET thus prepared and ethylene bislauric acid amide were mixed at a mass ratio of 90:10, and kneaded at 270 degrees C. in a vented twin screw extruder to provide master pellets (Nucleating Agent M2) containing 10 mass % of ethylene bislauric acid amide.

(Nucleating Agent M3)

The PET thus prepared and sodium montanate were mixed at a mass ratio of 90:10, and kneaded at 270 degrees C. in a vented twin screw extruder to provide master pellets (Nucleating agent M3) containing 10 mass % of sodium montanate.

(Nucleating Agent M4)

A mixture of 100 parts by mass of dimethyl terephthalate and 70 parts by mass of ethylene glycol was prepared and 0.04 parts by mass of manganese acetate was added, followed by heating gradually to a final temperature of 220 degrees C. at which ester interchange reaction was performed while distilling out methanol. Then, 0.025 parts by mass of an aqueous 85% phosphoric acid solution and 0.02 parts by mass of germanium dioxide were added, and 5 parts by mass of sodium acetate was further added, followed by a condensation polymerization reaction at 290 degrees C. under a reduced pressure of 1 hPa to provide a polyethylene terephthalate resin containing 5 mass % sodium acetate and copolymerized with 2 mol % of the by-product diethylene glycol, which had an intrinsic viscosity 0.65.

(Nucleating Agent M5)

The PET thus prepared and 2,4-di(P-methyl benzylidene) sorbitol were mixed at a mass ratio of 90:10, and kneaded at 270 degrees C. in a vented twin screw extruder to provide master pellets (Nucleating agent M5) containing 10 mass % of 2,4-di(P-methyl benzylidene) sorbitol.

Example 1

A three-layer laminated film with a Layer A/Layer B/Layer A configuration was produced. Polyester A that constitutes Layer A was prepared by mixing PET, PET-G, PBT, Nucleating agent M1, and Particle M at a mass ratio of 38.3:50:10:0.7:1. Layer B that constitutes Polyester B was prepared by mixing PET, PET-G, PBT, and Nucleating agent M1 at a mass ratio of 39.3:50:10:0.7. The polyester resin mixtures thus prepared were separately dried at 180 degrees C. for 4 hours in a vacuum dryer to remove moisture adequately, supplied separate single screw extruders, melted at 280 degrees C., sent through separate channels, each equipped with a filter and gear pump for removing foreign objects and ensuring uniform feeding, combined into a Layer A/Layer B/Layer A laminate in a feedblock installed at the top of the T-die (see Tables for main layer ratios), and discharged from the T-die onto a cooling drum controlled at a temperature of 25 degrees C. to form a sheet. In this step, a wire electrode with a diameter of 0.1 mm was used to apply static electricity to ensure close contact with the cooling drum to provide an unstretched film. Then, a heating roll was used prior to stretching in the length direction to perform preheating at a temperature of 90 degrees C., and finally the film was stretched 3.1 times in the length direction at a film temperature of 95 degrees C., immediately followed by cooling on a metal roll controlled at a temperature of 40 degrees C. Subsequently, the film was preheated at a temperature of and 70 degrees C. and stretched 3.1 times in the width direction at a temperature of 100 degrees C. in a tenter type transversal stretching machine, and the film, still staying in the tenter, was heat-treated at 235 degrees C. for 5 seconds while being relaxed by 3% in the width direction, to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 2

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 37:50:10:2:1. Layer B that constitutes Polyester B was prepared by mixing PET, PET-G, PBT, and Nucleating agent M1 at a mass ratio of 38:50:10:2. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 3

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 34:50:10:5:1. Layer B that constitutes Polyester B was prepared by mixing PET, PET-G, PBT, and Nucleating agent M1 at a mass ratio of 35:50:10:5. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 4

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 29:50:10:10:1. Layer B that constitutes Polyester B was prepared by mixing PET, PET-G, PBT, and Nucleating agent M1 at a mass ratio of 30:50:10:10. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 5

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 19:50:10:20:1. Layer B that constitutes Polyester B was prepared by mixing PET, PET-G, PBT, and Nucleating agent M1 at a mass ratio of 20:50:10:20. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 6

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 14:50:10:25:1. Layer B that constitutes Polyester B was prepared by mixing PET, PET-G, PBT, and Nucleating agent M1 at a mass ratio of 15:50:10:25. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 7

A three-layer laminated film with a Layer A/Layer B/Layer A configuration was produced. Polyester A that constituted Layer A was prepared by mixing PET, PET-G, PBT, Nucleating agent M1, and Particle M at a mass ratio of 39.6:50:10:5:0.4. Layer B that constitutes Polyester B was prepared by mixing PET, PET-G, PBT, and Nucleating agent M1 at a mass ratio of 39.6:50:10:0.4. Subsequently, the same procedures as in Example 1 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 8

A three-layer laminated film with a Layer A/Layer B/Layer A configuration was produced. Both Layer A and Layer B had the same composition as in Example 3, and an unstretched film with the same main layer ratio was prepared. The resulting unstretched film was preheated at a temperature of 90 degrees C., and finally the film was stretched 3.1 times in the length direction at a film temperature of 95 degrees C., immediately followed by cooling on a metal roll controlled at a temperature of 40 degrees C. Subsequently, the film was preheated at a temperature of and 80 degrees C. and stretched 3.1 times in the width direction at a temperature of 102 degrees C. in a tenter type transversal stretching machine, and the film, still staying in the tenter, was heat-treated at 235 degrees C. for 5 seconds while being relaxed by 3% in the width direction, to provide a biaxially oriented polyester film with a film thickness of 25 μm. Due to the higher temperature of stretching in the transversal direction, the resulting film was slightly lower in forming uniformity. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 9

A three-layer laminated film with a Layer A/Layer B/Layer A configuration was produced. Both Layer A and Layer B had the same composition as in Example 3, and an unstretched film with the same main layer ratio was prepared. The resulting unstretched film was preheated at a temperature of 90 degrees C., and finally the film was stretched 3.1 times in the length direction at a film temperature of 95 degrees C., immediately followed by cooling on a metal roll controlled at a temperature of 40 degrees C. Subsequently, the film was preheated at a temperature of and 95 degrees C. and stretched 3.1 times in the width direction at a temperature of 112 degrees C. in a tenter type transversal stretching machine, and the film, still staying in the tenter, was heat-treated at 235 degrees C. for 5 seconds while being relaxed by 3% in the width direction, to provide a biaxially oriented polyester film with a film thickness of 25 μm. Due to the higher temperature of preheating and stretching in the transversal direction, the resulting film was slightly lower in forming uniformity. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer b). Accordingly, the Tb/TF ratio was 1.

Example 10

A three-layer laminated film with a Layer A/Layer B/Layer A configuration was produced. Polyester A that constitutes Layer A was prepared by mixing PET, PET-G, PBT, and Particle M at a mass ratio of 19:60:20:1. Layer B that constitutes Polyester B was prepared by mixing PET, PET-G, PBT, and Nucleating agent M1 at a mass ratio of 14.3:60:20:5.7. Except for using a heat treatment temperature of 240 degrees C., the same procedures as in Example 1 was carried out to provide a biaxially oriented polyester film with a film thickness of 25 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 11

A three-layer laminated film with a Layer A/Layer B/Layer A configuration was produced. Polyester A that constitutes Layer A was prepared by mixing PET, PET-G, PBT, and Particle M at a mass ratio of 9:70:20:1. Layer B that constitutes Polyester B was prepared by mixing PET, PET-G, PBT, and Nucleating agent M1 at a mass ratio of 4.3:70:20:5.7. Subsequently, the same procedures as in Example 1 was carried out to provide a biaxially oriented polyester film with a film thickness of 25 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 12

A three-layer laminated film with a Layer A/Layer B/Layer A configuration was produced. Polyester A that constitutes Layer A was prepared by mixing PET, PET-G, and Particle M at a mass ratio of 18.8:80:1.2. Layer B that constitutes Polyester B was prepared by mixing PET, PET-G, and Nucleating agent M1 at a mass ratio of 14.2:80:5.8. Except for extending the film 3 times in the length direction and in the width direction, the same procedures as in Example 1 was carried out to provide a biaxially oriented polyester film with a film thickness of 15 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 13

A three-layer laminated film with a Layer A/Layer B/Layer A configuration was produced. Polyester A that constitutes Layer A was prepared by mixing PET, PET-I, and Particle M at a mass ratio of 28:70:2. Layer B that constitutes Polyester B was prepared by mixing PET, PET-I, and Nucleating agent M2 at a mass ratio of 19.1:70:10.9. Except for using a heat treatment temperature of 220 degrees C., the same procedures as in Example 1 was carried out subsequently to provide a biaxially oriented polyester film with a film thickness of 25 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 14

A three-layer laminated film with a Layer A/Layer B/Layer A configuration was produced. Polyester A that constitutes Layer A was prepared by mixing PET, PET-G, PBT, and Particle M at a mass ratio of 49:30:20:1. Layer B that constitutes Polyester B was prepared by mixing PET, PET-G, PBT, and Nucleating agent M2 at a mass ratio of 39.3:20:30:10.7. Except for extending the film 3.3 times in the length direction and 3.4 times in the width direction and using a heat treatment temperature of 220 degrees C., the same procedures as in Example 1 was carried out to provide a biaxially oriented polyester film with a film thickness of 32 μm. Though the content of the nucleating agent in the resulting film was in the optimum range, the plane orientation coefficient was slightly higher, and accordingly the formability decreased slightly. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 15

A three-layer laminated film with a Layer A/Layer B/Layer A configuration was produced. Polyester A that constitutes Layer A was prepared by mixing PET, PET-G, PBT, and Particle M at a mass ratio of 49:20:30:1. Layer B that constitutes Polyester B was prepared by mixing PET, PET-G, PBT, and Nucleating agent M2 at a mass ratio of 9.6:20:30:40.4. Subsequently, the same procedures as in Example 1 was carried out to provide a biaxially oriented polyester film with a film thickness of 15 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 16

A two-layer laminated film with a Layer A/Layer B configuration was produced. Polyester A that constituted Layer A was prepared by mixing PET, PET-G, PBT, Nucleating agent M3, and Particle M at a mass ratio of 23.5:20:30:25:1.5. Layer B that constitutes Polyester B was prepared by mixing PET, PET-G, PBT, and Nucleating agent M3 at a mass ratio of 25:20:30:25. Subsequently, the same procedures as in Example 1 was carried out to provide a biaxially oriented polyester film with a film thickness of 12 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer B). Accordingly, the TB/TF ratio was 1.

Example 17

A mono-layer film was produced. Polyester B that constituted Layer B was prepared by mixing PET, PET-G, PBT, Nucleating agent M3, and Particle M at a mass ratio of 34:20:20:25:1. Subsequently, the same procedures as in Example 1 was carried out to provide a biaxially oriented polyester film with a film thickness of 15 μm. The resulting film was a mono-layer film, and in Layer B, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Accordingly, the TB/TF ratio was 1.

Example 18

A two-layer laminated film with a Layer A/Layer B configuration was produced. Polyester A that constituted Layer A was prepared by mixing PET, PET-G, PBT, and Particle M at a mass ratio of 18.5:60:20:1.5. Layer B that constitutes Polyester B was prepared by mixing PET, PET-G, PBT, and Nucleating agent M4 at a mass ratio of 9.4:60:20:10.6. Subsequently, the same procedures as in Example 1 was carried out to provide a biaxially oriented polyester film with a film thickness of 20 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 19

A three-layer laminated film with a Layer A/Layer B/Layer A configuration was produced. Polyester A that constituted Layer A was prepared by mixing PET, PBT, Nucleating agent M5, and Particle M at a mass ratio of 63.8:35:0.4:0.8. Layer B that constitutes Polyester B was prepared by mixing PET, PBT, and Nucleating agent M5 at a mass ratio of 64.2:35:0.8. Subsequently, the same procedures as in Example 4 was carried out to provide a biaxially oriented polyester film with a film thickness of 25 μm. In both Layer A and Layer B of the resulting film, the ethylene glycol components accounted for 60 mol % or more of the glycol components that constituted the layers, and the crystal nucleating agent accounted for 0.01 to 5 mass % relative to 100 mass % of the entire layers. The crystal melting energy, ΔHm, was 5 to 35 J/g in both layers. Thus, both layers corresponded to a polyester layer (Layer B). Accordingly, the TB/TF ratio was 1. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 20

A three-layer laminated film with a Layer A/Layer B/Layer A configuration was produced. Polyester A that constituted Layer A was prepared by mixing PET, PET-G, PBT, and Particle M at a mass ratio of 19.2:60:20:0.8. Layer B that constitutes Polyester B was prepared by mixing PET, PET-G, PBT, and Nucleating agent M5 at a mass ratio of 11.3:60:20:8.7. Subsequently, the film, heated at 95 degrees C., was subjected to simultaneous biaxial stretching of 2.8 times×2.8 times and heat treatment at 225 degrees C. for 7 seconds to provide a biaxially oriented polyester film with a film thickness of 25 μm. In Layer B of the resulting film, the ethylene glycol component accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Example 21

A three-layer laminated film with a Layer A/Layer B/Layer A configuration was produced. Polyester A that constituted Layer A was prepared by mixing PET, PET-G, PBT, and Particle M at a mass ratio of 38.8:50:10:1.2. Layer B that constitutes Polyester B was prepared by mixing PET, PET-G, PBT, and Nucleating agent M5 at a mass ratio of 37.8:50:10:2.2., Except for performing heat treatment at 220 degrees C., the same procedures as in Example 1 was carried out subsequently to provide a biaxially oriented polyester film with a film thickness of 25 μm. In Layer B of the resulting film, the ethylene glycol accounted for 60 mol % or more of the glycol components that constituted the layer, and the crystal nucleating agent accounted for 0.01 to 5 mass % relative to 100 mass % of the entire layer. The crystal melting energy, ΔHm, was 5 to 35 J/g in the layer. Thus, Layer B corresponded to a polyester layer (Layer b).

Comparative Example 1

A three-layer laminated film with a Layer A/Layer B/Layer A configuration was produced. Polyester A that constitutes Layer A was prepared by mixing PET, PET-G, PBT, and Particle M at a mass ratio of 39:50:10:1. Layer B that constitutes Polyester B was prepared by mixing PET, PET-G, and PBT at a mass ratio of 40:50:10. Subsequently, the same procedures as in Example 4 was carried out to provide a biaxially oriented polyester film with a film thickness of 25 μm. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

Comparative Example 2

A mono-layer film was produced. Polyester B that constitutes Layer B was prepared by mixing PET, PET-G, PBT, Nucleating agent M5, and Particle M at a mass ratio of 38.92:50:10:0.08:1. Subsequently, the same procedures as in Example 4 was carried out to provide a biaxially oriented polyester film with a film thickness of 40 μm. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layer.

Comparative Example 3

A three-layer laminated film with a Layer A/Layer B/Layer A configuration was produced. Polyester A that constitutes Layer A was prepared by mixing PET, PET-G, PBT, and Particle M at a mass ratio of 48.5:20:30:1.5. Layer B that constitutes Polyester B was prepared by mixing PET-G, PBT, and Nucleating agent M1 at a mass ratio of 20:20:60. Subsequently, the same procedures as in Example 1 was carried out to provide a biaxially oriented polyester film with a film thickness of 25 μm. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

Comparative Example 4

A two-layer laminated film with a Layer A/Layer B configuration was produced. Polyester A that constitutes Layer A was prepared by mixing PET, PET-G, PBT, and Particle M at a mass ratio of 9:80:10:1. Layer B that constitutes Polyester B was prepared by mixing PET-G, PBT, and Nucleating agent M3 at a mass ratio of 81.5:10:8.5. Subsequently, the same procedures as in Example 1 was carried out to provide a biaxially oriented polyester film with a film thickness of 25 μm. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

Comparative Example 5

A two-layer laminated film with a Layer A/Layer B configuration was produced. Polyester A that constitutes Layer A was prepared by mixing PET, PET-G, PBT, and Particle M at a mass ratio of 73.5:10:15:1.5. Layer B that constitutes Polyester B was prepared by mixing PET, PET-G, PBT, and Nucleating agent M4 at a mass ratio of 64.4:10:15:10.6. Subsequently, the same procedures as in Example 1 was carried out to provide a biaxially oriented polyester film with a film thickness of 25 μm. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

Comparative Example 6

A two-layer laminated film with a Layer A/Layer B configuration was produced. Polyester A that constitutes Layer A was prepared by mixing PET, PET-G, PBT, and Particle M at a mass ratio of 73.5:10:15:1.5. Layer B that constitutes Polyester B was prepared by mixing PET, PET-G, PBT, and Nucleating agent M4 at a mass ratio of 20:10:15:55. The polyester resin mixtures thus prepared were separately dried at 180 degrees C. for 4 hours in a vacuum dryer to remove moisture adequately, supplied separate single screw extruders, melted at 280 degrees C., sent through separate channels, each equipped with a filter and gear pump for removing foreign objects and ensuring uniform feeding, combined into a Layer A/Layer B/Layer A laminate in a feedblock installed at the top of the T-die (see Tables for main layer ratios), and discharged from the T-die onto a cooling drum controlled at a temperature of 25 degrees C. to form a sheet. In this step, a wire electrode with a diameter of 0.1 mm was used to apply static electricity to ensure close contact with the cooling drum to provide an unstretched film. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

Comparative Example 7

A two-layer laminated film with a Layer A/Layer B configuration was produced. Polyester A that constitutes Layer A was prepared by mixing PET, PET-G, PBT, and Particle M at a mass ratio of 73.5:10:15:1.5. Layer B that constitutes Polyester B was prepared by mixing PET, PET-G, PBT, and Nucleating agent M4 at a mass ratio of 20:10:15:55. Subsequently, the same procedures as in Example 1 was carried out in an attempt to stretch the film, but crystallization proceeded, making it impossible to produce a biaxially oriented film.

Comparative Example 8

A two-layer laminated film with a Layer A/Layer B configuration was produced. Polyester A that constitutes Layer A was prepared by mixing PET, PET-G, PBT, and Particle M at a mass ratio of 73.5:10:15:1.5. Layer B that constitutes Polyester B was prepared by mixing PET, PET-G, PBT, and Nucleating agent M4 at a mass ratio of 75:10:15. Subsequently, the same procedures as in Example 6 was carried out to provide an unstretched film. The resulting film does not contain a polyester layer that corresponds to Layer b in which the ethylene glycol component accounts for 60 mol % or more of the glycol components while the crystal nucleating agent account for 0.01 to 5 mass % relative to 100 mass % of the entire layers, and the crystal melting energy, ΔHm, is 5 to 35 J/g in the layers.

TABLE 1

| | | | Example 1 | Example 2 | Example 3 | Example 4 |
|---|---|---|---|---|---|---|
| Film constitution | Layer B (parts by mass in parentheses) | | PET (39.3) PET-G (50) PBT (10) Nucleating agent M1 (0.7) | PET (38) PET-G (50) PBT (10) Nucleating agent M1 (2) | PET (35) PET-G (50) PBT (10) Nucleating agent M1 (5) | PET (30) PET-G (50) PBT (10) Nucleating agent M1 (10) |
| | Layer A (parts by mass in parentheses) | | PET (38.3) PET-G (50) PBT (10) Nucleating agent M1 (0.7) Particle M (1) | PET (37) PET-G (50) PBT (10) Nucleating agent M1 (2) Particle M (1) | PET (34) PET-G (50) PBT (10) Nucleating agent M1 (5) Particle M (1) | PET (29) PET-G (50) PBT (10) Nucleating agent M1 (10) Particle M (1) |
| Layer constitution (layer thickness (μm)) | | | A/B/A (1/23/1) | A/B/A (1/23/1) | A/B/A (1/23/1) | A/B/A (1/23/1) |
| Main layer ratio | | | 0.92 | 0.92 | 0.92 | 0.92 |
| Layer thickness ratio (TB/TF) | | | 1 | 1 | 1 | 1 |
| Composition | Layer B | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |
| | | Acid (mol % in parentheses) | TPA (100) | TPA (100) | TPA (100) | TPA (100) |
| | Layer A | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |
| | | Acid (mol % in parentheses) | TPA (100) | TPA (100) | TPA (100) | TPA (100) |
| | Entire film | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |

TABLE 1-continued

|  |  |  | Example 1 | Example 2 | Example 3 | Example 4 |
|---|---|---|---|---|---|---|
|  |  | Acid (mol % in parentheses) | TPA (100) | TPA (100) | TPA (100) | TPA (100) |
| Nucleating agent | Layer B | Type | Barium stearate | Barium stearate | Barium stearate | Barium stearate |
|  |  | Content (mass %) | 0.07 | 0.2 | 0.5 | 1 |
|  | Layer A | Type | Barium stearate | Barium stearate | Barium stearate | Barium stearate |
|  |  | Content (mass %) | 0.07 | 0.2 | 0.5 | 1 |
|  | Entire film | Type | Barium stearate | Barium stearate | Barium stearate | Barium stearate |
|  |  | Content (mass %) | 0.07 | 0.2 | 0.5 | 1 |
| Crystal melting energy (J/g) | Layer B |  | 22 | 22 | 22 | 22 |
|  | Layer A |  | 19 | 20 | 20 | 21 |
|  | Entire film |  | 21 | 21 | 21 | 22 |
| Plane orientation coefficient |  |  | 0.082 | 0.074 | 0.071 | 0.058 |
| Melting point (° C.) |  |  | 248 | 248 | 248 | 248 |
| Heat resistance A |  |  | S | S | S | S |
| Heat resistance B |  |  | S | S | S | S |
| Dimensional stability A |  |  | S | S | S | S |
| Dimensional stability B |  |  | S | S | S | A |
| Formability | F100 (MPa) MD/TD |  | 8.2/8.8 | 8/8.4 | 7.7/8.2 | 6.2/6.7 |
|  | Rupture elongation (%) MD/TD |  | 406/402 | 487/472 | 512/503 | 533/517 |
|  | Vacuum formability |  | A | S | S | S |
|  | Uniform formability |  | S | S | S | S |
| Haze (%) |  |  | 0.8 | 1 | 1.2 | 1.4 |

TABLE 2

|  |  |  | Example 5 | Example 6 | Example 7 | Example 8 |
|---|---|---|---|---|---|---|
| Film constitution | Layer B (parts by mass in parentheses) |  | PET (20) PET-G (50) PBT (10) Nucleating agent M1 (20) | PET (15) PET-G (50) PBT (10) Nucleating agent M1 (25) | PET (39.6) PET-G (50) PBT (10) Nucleating agent M1 (0.4) | PET (35) PET-G (50) PBT (10) Nucleating agent M1 (5) |
|  | Layer A (parts by mass in parentheses) |  | PET (19) PET-G (50) PBT (10) Nucleating agent M1 (20) Particle M (1) | PET (14) PET-G (50) PBT (10) Nucleating agent M1 (25) Particle M (1) | PET (39.6) PET-G (50) PBT (10) Nucleating agent M1 (5) Particle M (0.4) | PET (34) PET-G (50) PBT (10) Nucleating agent M1 (5) Particle M (1) |
| Layer constitution (layer thickness (μm)) |  |  | A/B/A (1/23/1) | A/B/A (1/23/1) | A/B/A (1/23/1) | A/B/A (1/23/1) |
| Main layer ratio |  |  | 0.92 | 0.92 | 0.92 | 0.92 |
| Layer thickness ratio (TB/TF) |  |  | 1 | 1 | 1 | 1 |
| Composition | Layer B | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |
|  |  | Acid (mol % in parentheses) | TPA (100) | TPA (100) | TPA (100) | TPA (100) |
|  | Layer A | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |
|  |  | Acid (mol % in parentheses) | TPA (100) | TPA (100) | TPA (100) | TPA (100) |
|  | Entire film | Glycol component (mol % in parentheses) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) | EG (75.9) CHDM (12.9) BD (9.4) DEG (1.8) |
|  |  | Acid (mol % in parentheses) | TPA (100) | TPA (100) | TPA (100) | TPA (100) |
| Nucleating agent | Layer B | Type | Barium stearate | Barium stearate | Barium stearate | Barium stearate |
|  |  | Content (mass %) | 2 | 2.5 | 0.04 | 0.5 |
|  | Layer A | Type | Barium stearate | Barium stearate | Barium stearate | Barium stearate |
|  |  | Content (mass %) | 2 | 2.5 | 0.04 | 0.5 |
|  | Entire film | Type | Barium stearate | Barium stearate | Barium stearate | Barium stearate |
|  |  | Content (mass %) | 2 | 2.5 | 0.04 | 0.5 |
| Crystal melting energy (J/g) | Layer B |  | 22 | 23 | 20 | 22 |
|  | Layer A |  | 21 | 21 | 19 | 20 |
|  | Entire film |  | 22 | 22 | 19 | 21 |
| Plane orientation coefficient |  |  | 0.052 | 0.038 | 0.09 | 0.075 |
| Melting point (° C.) |  |  | 248 | 228 | 248 | 248 |
| Heat resistance A |  |  | S | S | S | S |
| Heat resistance B |  |  | S | S | S | S |

TABLE 2-continued

|  |  | Example 5 | Example 6 | Example 7 | Example 8 |
|---|---|---|---|---|---|
| Dimensional stability A |  | S | A | S | S |
| Dimensional stability B |  | A | B | S | S |
| Formability | F100 (MPa) MD/TD | 8.3/8.7 | 9 | 11.5/12.7 | 7.5/15.2 |
|  | Rupture elongation (%) MD/TD | 442/429 | 411/406 | 348/342 | 478/426 |
|  | Vacuum formability | S | A | B | A |
|  | Uniform formability | A | B | S | A |
| Haze (%) |  | 1.9 | 2.5 | 1.2 | 1.2 |

TABLE 3

|  |  |  | Example 9 | Example 10 | Example 11 | Example 12 |
|---|---|---|---|---|---|---|
| Film constitution | Layer B (parts by mass in parentheses) |  | PET (35) PET-G (50) PBT (10) Nucleating agent M1 (5) | PET (14.3) PET-G (60) PBT (20) Nucleating agent M1 (5.7) | PET (4.3) PET-G (70) PBT (20) Nucleating agent M1 (5.7) | PET (14.2) PET-G (80) Nucleating agent M1 (5.8) |
|  | Layer A (parts by mass in parentheses) |  | PET (34) PET-G (50) PBT (10) Nucleating agent M1 (5) Particle M (1) | PET (19) PET-G (60) PBT (20) Particle M (1) | PET (9) PET-G (70) PBT (20) Particle M (1) | PET (18.8) PET-G (80) Particle M (1.2) |
| Layer constitution (layer thickness (μm)) |  |  | A/B/A (1/23/1) | A/B/A (1.5/22/1.5) | A/B/A (1.5/22/1.5) | A/B/A (1/13/1) |
| Main layer ratio |  |  | 0.92 | 0.88 | 0.88 | 0.87 |
| Layer thickness ratio (TB/TF) |  |  | 1 | 0.88 | 0.88 | 0.87 |
| Composition | Layer B | Glycol component (mol % in parentheses) | EG (75.9) CHDM (12.9) BD (9.4) DEG (1.8) | EG (63.3) CHDM (15.9) BD (19.2) DEG (1.6) | EG (59.5) CHDM (18.9) BD (20) DEG (1.6) | EG (76.4) CHDM (21.6) DEG (2) |
|  |  | Acid (mol % in parentheses) | TPA (100) | TPA (100) | TPA (100) | TPA (100) |
|  | Layer A | Glycol component (mol % in parentheses) | EG (75.9) CHDM (12.9) BD (9.4) DEG (1.8) | EG (63.3) CHDM (15.9) BD (19.2) DEG (1.6) | EG (59.5) CHDM (18.9) BD (20) DEG (1.6) | EG (76.4) CHDM (21.6) DEG (2) |
|  |  | Acid (mol % in parentheses) | TPA (100) | TPA (100) | TPA (100) | TPA (100) |
|  | Entire film | Glycol component (mol % in parentheses) | EG (75.9) CHDM (12.9) BD (9.4) DEG (1.8) | EG (63.3) CHDM (15.9) BD (19.2) DEG (1.6) | EG (59.5) CHDM (18.9) BD (20) DEG (1.6) | EG (76.4) CHDM (21.6) DEG (2) |
|  |  | Acid (mol % in parentheses) | TPA (100) | TPA (100) | TPA (100) | TPA (100) |
| Nucleating agent | Layer B | Type Content (mass %) | Barium stearate 0.5 | Barium stearate 0.57 | Barium stearate 0.57 | Barium stearate 0.58 |
|  | Layer A | Type Content (mass %) | Barium stearate 0.5 | — | — | — |
|  | Entire film | Type Content (mass %) | Barium stearate 0.5 | Barium stearate 0.5 | Barium stearate 0.5 | Barium stearate 0.5 |
| Crystal melting energy (J/g) | Layer B |  | 22 | 17 | 12 | 8 |
|  | Layer A |  | 20 | 16 | 11 | 8 |
|  | Entire film |  | 21 | 17 | 12 | 8 |
| Plane orientation coefficient |  |  | 0.079 | 0.061 | 0.054 | 0.05 |
| Melting point (° C.) |  |  | 248 | 246 | 243 | 242 |
| Heat resistance A |  |  | S | S | S | A |
| Heat resistance B |  |  | S | S | A | B |
| Dimensional stability A |  |  | S | S | S | S |
| Dimensional stability B |  |  | S | A | A | A |
| Formability | F100 (MPa) MD/TD |  | 7.3/22.1 | 7.6/7.5 | 6.9/7.5 | 6.1/7.0 |
|  | Rupture elongation (%) MD/TD |  | 436/338 | 527/551 | 566/557 | 587/592 |
|  | Vacuum formability |  | B | S | S | S |
|  | Uniform formability |  | B | S | S | S |
| Haze (%) |  |  | 1.2 | 0.9 | 0.9 | 0.8 |

TABLE 4

| | | Example 13 | Example 14 | Example 15 | Example 16 |
|---|---|---|---|---|---|
| Film constitution | Layer B (parts by mass in parentheses) | PET (19.1) PET-I (70) Nucleating agent M2 (10.9) | PET (39.3) PET-G (20) PBT (30) Nucleating agent M2 (10.7) | PET (9.6) PET-G (20) PBT (30) Nucleating agent M2 (40.4) | PET (25) PET-G (20) PBT (30) Nucleating agent M3 (25) |
| | Layer A (parts by mass in parentheses) | PET (28) PET-I (70) Particle M (2) | PET (49) PET-G (30) PBT (20) Particle M (1) | PET (49) PET-G (20) PBT (30) Particle M (1) | PET (23.5) PET-G (20) PBT (30) Nucleating agent M3 (25) Particle M (1.5) |
| Layer constitution (layer thickness (μm)) | | A/B/A (1/23/1) | A/B/A (1/30/1) | A/B/A (1/13/1) | A/B (1.5/10.5) |
| Main layer ratio | | 0.92 | 0.94 | 0.87 | 0.88 |
| Layer thickness ratio (TB/TF) | | 0.92 | 0.94 | 0.87 | 1 |
| Composition | Layer B Glycol component (mol % in parentheses) | EG (98) DEG (2) | EG (70.3) CHDM (8.1) BD (20) DEG (1.6) | EG (63.2) CHDM (5.4) BD (30) DEG (1.4) | EG (65.5) CHDM (5.2) BD (27.9) DEG (1.4) |
| | Acid (mol % in parentheses) | TPA (87.7) IPA (12.3) | TPA (100) | TPA (100) | TPA (100) |
| | Layer A Glycol component (mol % in parentheses) | EG (98) DEG (2) | EG (63.2) CHDM (5.4) BD (30) DEG (1.4) | EG (63.2) CHDM (5.4) BD (30) DEG (1.4) | EG (65.5) CHDM (5.2) BD (27.9) DEG (1.4) |
| | Acid (mol % in parentheses) | TPA (87.7) IPA (12.3) | TPA (100) | TPA (100) | TPA (100) |
| | Entire film Glycol component (mol % in parentheses) | EG (98) DEG (2) | EG (69.9) CHDM (7.9) BD (20.6) DEG (1.6) | EG (63.2) CHDM (5.4) BD (30) DEG (1.4) | EG (65.5) CHDM (5.2) BD (27.9) DEG (1.4) |
| | Acid (mol % in parentheses) | TPA (87.7) IPA (12.3) | TPA (100) | TPA (100) | TPA (100) |
| Nucleating agent | Layer B Type | Ethylene bislauric acid amide | Ethylene bislauric acid amide | Ethylene bislauric acid amide | Sodium montanate |
| | Content (mass %) | 1.1 | 1.1 | 4.0 | 2.5 |
| | Layer A Type | — | — | — | Sodium montanate |
| | Content (mass %) | — | — | — | 2.5 |
| | Entire film Type | Ethylene bislauric acid amide | Ethylene bislauric acid amide | Ethylene bislauric acid amide | Sodium montanate |
| | Content (mass %) | 1.0 | 1.0 | 3.5 | 2.5 |
| Crystal melting energy (J/g) | Layer B | 28 | 23 | 26 | 26 |
| | Layer A | — | — | 22 | 26 |
| | Entire film | 28 | 23 | 24 | 26 |
| Plane orientation coefficient | | 0.108 | 0.126 | 0.095 | 0.115 |
| Melting point (°C) | | 228 | 250 | 248 | 250 |
| Heat resistance A | | B | S | S | S |
| Heat resistance B | | S | S | S | S |
| Dimensional stability A | | S | S | S | S |
| Dimensional stability B | | S | S | S | S |
| Formability | F100 (MPa) MD/TD | 12.4/14.4 | 18.9/19.7 | 8.4/9.2 | 14.6/13.7 |
| | Rupture elongation (%) MD/TD | 503/514 | 423/440 | 403/413 | 437/441 |
| | Vacuum formability | S | A | A | A |
| | Uniform formability | S | S | B | B |
| Haze (%) | | 1.5 | 0.8 | 2.4 | 1.6 |

TABLE 5

| | | Example 17 | Example 18 | Example 19 | Example 20 | Example 21 |
|---|---|---|---|---|---|---|
| Film constitution | Layer B (parts by mass in parentheses) | PET (34) PET-G (20) PBT (20) Nucleating agent M3 (25) Particle M (1) | PET (9.4) PET-G (60) PBT (20) Nucleating agent M4 (10.6) | PET (64.2) PBT (35) Nucleating agent M5 (0.8) | PET (11.3) PET-G (60) PBT (20) Nucleating agent M5 (8.7) | PET (37.8) PET-G (50) PBT (10) Nucleating agent M5 (2.2) |
| | Layer A (parts by mass in parentheses) | — | PET (18.5) PET-G (60) PBT (20) Particle M (1.5) | PET (63.8) PBT (35) Nucleating agent M5 (0.4) Particle M (0.8) | PET (19.2) PET-G (60) PBT (20) Particle M (0.8) | PET (38.8) PET-G (50) PBT (10) Particle M (1.2) |

TABLE 5-continued

|  |  |  | Example 17 | Example 18 | Example 19 | Example 20 | Example 21 |
|---|---|---|---|---|---|---|---|
| Layer constitution (layer thickness (μm)) | | | B (15) | A/B (1/19) | A/B/A (1/18/1) | A/B/A (1/23/1) | A/B/A (1/23/1) |
| Main layer ratio | | | 1 | 0.94 | 0.9 | 0.92 | 0.92 |
| Layer thickness ratio (TB/TF) | | | 1 | 0.95 | 1 | 0.92 | 0.92 |
| Composition | Layer B | Glycol component (mol % in parentheses) | EG (74.9) CHDM (5.1) BD (18.4) DEG (1.6) | EG (62.2) CHDM (16.2) BD (20) DEG (1.6) | EG (63.2) BD (35) DEG (1.8) | EG (62.2) CHDM (16.2) BD (20) DEG (1.6) | EG (74.7) CHDM (13.5) BD (10) DEG (1.8) |
| | | Acid (mol % in parentheses) | TPA (100) | TPA (100) | TPA (100) | TPA (100) | TPA (100) |
| | Layer A | Glycol component (mol % in parentheses) | — | EG (62.2) CHDM (16.2) BD (20) DEG (1.6) | EG (63.2) BD (35) DEG (1.8) | EG (62.2) CHDM (16.2) BD (20) DEG (1.6) | EG (74.7) CHDM (13.5) BD (10) DEG (1.8) |
| | | Acid (mol % in parentheses) | — | TPA (100) | TPA (100) | TPA (100) | TPA (100) |
| | Entire film | Glycol component (mol % in parentheses) | EG (74.9) CHDM (5.1) BD (18.4) DEG (1.6) | EG (62.2) CHDM (16.2) BD (20) DEG (1.6) | EG (63.2) BD (35) DEG (1.8) | EG (62.2) CHDM (16.2) BD (20) DEG (1.6) | EG (74.7) CHDM (13.5) BD (10) DEG (1.8) |
| | | Acid (mol % in parentheses) | TPA (100) | TPA (100) | TPA (100) | TPA (100) | TPA (100) |
| Nucleating agent | Layer B | Type | Sodium montanate | Sodium acetate | 2,4-di(P-methyl benzylidene) sorbitol | 2,4-di(P-methyl benzylidene) sorbitol | 2,4-di(P-methyl benzylidene) sorbitol |
| | | Content (mass %) | 2.5 | 0.53 | 0.080 | 0.87 | 0.22 |
| | Layer A | Type | — | — | 2,4-di(P-methyl benzylidene) sorbitol | — | — |
| | | Content (mass %) | — | — | 0.080 | — | — |
| | Entire film | Type | Sodium montanate | Sodium acetate | 2,4-di(P-methyl benzylidene) sorbitol | 2,4-di(P-methyl benzylidene) sorbitol | 2,4-di(P-methyl benzylidene) sorbitol |
| | | Content (mass %) | 2.5 | 0.50 | 0.080 | 0.80 | 0.20 |
| Crystal melting energy (J/g) | Layer B | | 29 | 18 | 35 | 19 | 18 |
| | Layer A | | — | 16 | 32 | 18 | 17 |
| | Entire film | | 29 | 18 | 34 | 19 | 18 |
| Plane orientation coefficient | | | 0.125 | 0.047 | 0.128 | 0.036 | 0.094 |
| Melting point (° C.) | | | 252 | 246 | 251 | 247 | 250 |
| Heat resistance A | | | S | S | S | S | S |
| Heat resistance B | | | S | S | S | S | S |
| Dimensional stability A | | | S | S | S | A | S |
| Dimensional stability B | | | S | A | S | B | S |
| Formability | F100 (MPa) MD/FD | | 14.9/14.8 | 5.7/5.9 | 26.3/28.8 | 5.1/5.9 | 7.8/8.6 |
| | Rupture elongation (%) MD/TD | | 407/404 | 593/581 | 404/417 | 712/704 | 536/522 |
| | Vacuum formability | | A | S | A | S | S |
| | Uniform formability | | B | S | S | S | S |
| Haze (%) | | | 2.1 | 0.9 | 0.8 | 2.3 | 0.9 |

TABLE 6

|  |  | Comparative example 1 | Comparative example 2 | Comparative example 3 | Comparative example 4 |
|---|---|---|---|---|---|
| Film constitution | Layer B (parts by mass in parentheses) | PET (40) PET-G (50) PBT (10) | PET (38.92) PET-G (50) PBT (10) Nucleating agent M5 (0.08) Particle M (1) | PET-G (20) PBT (20) Nucleating agent M1 (60) | PET-G (81.5) PBT (10) Nucleating agent M3 (8.5) |
| | Layer A (parts by mass in parentheses) | PET (39) PET-G (50) PBT (10) Particle M (1) | — | PET (48.5) PET-G (20) PBT (30) Particle M (1.5) | PET (9) PET-G (80) PBT (10) Particle M (1) |
| Layer constitution (layer thickness (μm)) | | A/B/A (1/23/1) | B (40) | A/B/A (1/23/1) | A/B (1.5/23.5) |
| Main layer ratio | | 0.92 | 1 | 0.92 | 0.94 |
| Layer thickness ratio (TB/TF) | | — | — | — | — |
| Composition | Layer B | Glycol component (mol % in parentheses) | EG (74.7) CHDM (13.5) BD (10) DEG (1.8) | EG (74.7) CHDM (13.5) BD (10) DEG (1.8) | EG (73) CHDM (5.4) BD (20) DEG (1.6) | EG (66.2) CHDM (22) BD (10) DEG (1.8) |

TABLE 6-continued

|  |  |  | Comparative example 1 | Comparative example 2 | Comparative example 3 | Comparative example 4 |
|---|---|---|---|---|---|---|
|  | Layer A | Acid (mol % in parentheses) | TPA (100) | TPA (100) | TPA (100) | TPA (100) |
|  |  | Glycol component (mol % in parentheses) | EG (74.7) CHDM (13.5) BD (10) DEG (1.8) | — | EG (63.2) CHDM (5.4) BD (30) DEG (1.4) | EG (66.6) CHDM (21.6) BD (10) DEG (1.8) |
|  | Entire film | Acid (mol % in parentheses) | TPA (100) | — | TPA (100) | TPA (100) |
|  |  | Glycol component (mol % in parentheses) | EG (74.7) CHDM (13.5) BD (10) DEG (1.8) | EG (74.7) CHDM (13.5) BD (10) DEG (1.8) | EG (72.2) CHDM (5.4) BD (20.8) DEG (1.6) | EG (66.2) CHDM (22) BD (10) DEG (1.8) |
|  |  | Acid (mol % in parentheses) | TPA (100) | TPA (100) | TPA (100) | TPA (100) |
| Nucleating agent | Layer B | Type | — | 2,4-di(P-methyl benzylidene) sorbitol | Barium stearate | Sodium montanate |
|  |  | Content (mass %) | — | 0.0080 | 6.0 | 0.85 |
|  | Layer A | Type | — | — | — | — |
|  |  | Content (mass %) | — | — | — | — |
|  | Entire film | Type | — | 2,4-di(P-methyl benzylidene) sorbitol | Barium stearate | Sodium montanate |
|  |  | Content (mass %) | 0 | 0.0080 | 5.5 | 0.80 |
| Crystal melting energy (J/g) | | Layer B | 17 | 18 | 25 | 4.4 |
|  |  | Layer A | 17 | — | 23 | 4.0 |
|  |  | Entire film | 17 | 18 | 24 | 4.3 |
| Plane orientation coefficient | | | 0.118 | 0.112 | 0.041 | 0.043 |
| Melting point (° C.) | | | 250 | 250 | 246 | 238 |
| Heat resistance A | | | S | S | S | A |
| Heat resistance B | | | S | S | S | C |
| Dimensional stability A | | | S | S | S | C |
| Dimensional stability B | | | S | S | A | A |
| Formability | | F100 (MPa) MD/TD | 23.4/22.6 | 22.3/24.8 | — | 5.3/5.7 |
|  |  | Rupture elongation (%) MD/TD | 270/264 | 284/267 | 89/92 | 554/524 |
|  |  | Vacuum formability | C | C | C | S |
|  |  | Uniform formability | S | S | C | S |
| Haze (%) | | | 0.8 | 2.2 | 3.5 | 0.8 |

TABLE 7

|  |  |  | Comparative example 5 | Comparative example 6 | Comparative example 7 | Comparative example 8 |
|---|---|---|---|---|---|---|
| Film constitution | Layer B (parts by mass in parentheses) | | PET (64.4) PET-G (10) PBT (15) Nucleating agent M4 (10.6) | PET (20) PET-G (10) PBT (15) Nucleating agent M4 (55) | PET (20) PET-G (10) PBT (15) Nucleating agent M4 (55) | PET (75) PET-G (10) PBT (15) |
|  | Layer A (parts by mass in parentheses) | | PET (73.5) PET-G (10) PBT (15) Particle M (1.5) | PET (73.5) PET-G (10) PBT (15) Particle M (1.5) | PET (73.5) PET-G (10) PBT (15) Particle M (1.5) | PET (73.5) PET-G (10) PBT (15) Particle M (1.5) |
| Layer constitution (layer thickness (μm)) | | | A/B (1.5/23.5) | A/B (15/235) | A/B (1.5/23.5) | A/B (1.5/23.5) |
| Main layer ratio | | | 0.94 | 0.94 | 0.94 | 0.94 |
| Layer thickness ratio (TB/TF) | | | — | — | — | — |
| Composition | Layer B | Glycol component (mol % in parentheses) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) |
|  |  | Acid (mol % in parentheses) | TPA (100) | TPA (100) | TPA (100) | TPA (100) |
|  | Layer A | Glycol component (mol % in parentheses) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) |
|  |  | Acid (mol % in parentheses) | TPA (100) | TPA (100) | TPA (100) | TPA (100) |
|  | Entire film | Glycol component (mol % in parentheses) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) | EG (80.6) CHDM (2.7) BD (15) DEG (1.7) |

TABLE 7-continued

|  |  |  | Comparative example 5 | Comparative example 6 | Comparative example 7 | Comparative example 8 |
|---|---|---|---|---|---|---|
|  |  | Acid (mol % in parentheses) | TPA (100) | TPA (100) | TPA (100) | TPA (100) |
| Nucleating agent | Layer B | Type | Sodium acetate | Sodium acetate | Sodium acetate | — |
|  |  | Content (mass %) | 0.53 | 5.5 | 5.5 | — |
|  | Layer A | Type | — | — | — | — |
|  |  | Content (mass %) | — | — | — | — |
|  | Entire film | Type | Sodium acetate | Sodium acetate | Sodium acetate | — |
|  |  | Content (mass %) | 0.50 | 5.2 | 5.2 | — |
| Crystal melting energy (J/g) | Layer B |  | 38 | 40 | — | 37 |
|  | Layer A |  | 37 | 37 | — | 37 |
|  | Entire film |  | 37 | 38 | — | 37 |
| Plane orientation coefficient |  |  | 0.138 | 0 | — | 0 |
| Melting point (° C.) |  |  | 250 | 250 | — | 250 |
| Heat resistance A |  |  | S | S | — | S |
| Heat resistance B |  |  | S | S | — | S |
| Dimensional stability A |  |  | S | C | — | C |
| Dimensional stability B |  |  | S | C | — | C |
| Formability |  | F100 (MPa) MD/TD | 46.7/48.8 | — | — | 3.1/2.2 |
|  |  | Rupture elongation (%) MD/TD | 173/168 | 83/75 | — | 717/713 |
|  |  | Vacuum formability | C | C | — | S |
|  |  | Uniform formability | S | C | — | S |
| Haze (%) |  |  | 2.7 | 4.1 | — | 0.8 |

The abbreviations in Tables are as follows.
EG: ethylene glycol component
DEG: diethylene glycol component
BD: 1,4-butanediol component
PG: 1,3-propylene glycol component
CHDM: 1,4-cyclohexane dimethanol component
TPA: terephthalic acid residue component
IPA: isophthalic acid residue component
F100: stress at 100% elongation

INDUSTRIAL APPLICABILITY

The invention relates to a polyester film, and in particular relates to a polyester film that is so high in formability as to serve preferably as material for building materials, automobile parts, cellular phones, and electric products.

The invention claimed is:

1. A biaxially oriented polyester film comprising an ethylene glycol component that accounts for 62.2 mol % or more of glycol components in the polyester film, containing a crystal nucleating agent up to 0.01 to 5 mass % relative to the entire polyester film that accounts for 100 mass %, and having a crystal melting energy, ΔHm, of 5 to 35 J/g, a plane orientation coefficient of 0.07 to 0.13, a breaking elongation in a length direction and in a width direction of 420% to 700%, and an F100 value in length and width directions at 150° C. of 3 to 30 MPa.

2. The biaxially oriented polyester film as claimed in Claim 1, wherein said crystal nucleating agent is at least one selected from the group consisting of an aliphatic carboxylic acid amide, an aliphatic carboxylate, and a sorbitol compound.

3. The biaxially oriented polyester film as claimed in Claim 1, having a plane orientation coefficient of 0.07 to 0.11.

4. The biaxially oriented polyester film as claimed in Claim 1, having a melting point of 230 to 255 degrees C.

5. A product formed from the biaxially oriented polyester film as claimed in Claim 1.

6. The biaxially oriented polyester film as claimed in Claim 1, comprising a polyester layer (Layer b), wherein the ethylene glycol component accounts for 60 mol % or more of the glycol components that constitute said polyester layer (Layer b), said crystal nucleating agent accounting for 0.01 to 5 mass % relative to said polyester layer that accounts for 100 mass %, said crystal melting energy, ΔHm, being in the range of 5 to 35 J/g, and the ratio of the layer thickness of said polyester layer (Layer b), TB(μm), to film thickness of said polyester film, TF(μm), being 0.6 or more.

7. The biaxially oriented polyester film as claimed in Claim 6, wherein a 1,4-cyclohexanedimethanol component accounts for 1 to 30 mol % of the glycol components that constitute the polyester layer (Layer b).

8. The biaxially oriented polyester film as claimed in claim 6, wherein a 1,4-butanediol and/or 1,3-propanediol components account for 1 to 30 mol % of the glycol components that constitute the polyester layer (Layer b).

9. The biaxially oriented polyester film as claimed in Claim 6, wherein said crystal nucleating agent is at least one selected from the group consisting of an aliphatic carboxylic acid amide, an aliphatic carboxylate, and a sorbitol compound.

* * * * *